(12) United States Patent
Miller et al.

(10) Patent No.: US 10,873,106 B2
(45) Date of Patent: *Dec. 22, 2020

(54) COMPOSITE SOLID ELECTROLYTES FOR LITHIUM BATTERIES

(71) Applicant: University of Utah Research Foundation, Salt Lake City, UT (US)

(72) Inventors: Jan D. Miller, Salt Lake City, UT (US); Xuming Wang, Salt Lake City, UT (US); Yue Lin, Salt Lake City, UT (US); Jin Liu, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/085,956

(22) PCT Filed: Mar. 16, 2017

(86) PCT No.: PCT/US2017/022774
§ 371 (c)(1),
(2) Date: Sep. 17, 2018

(87) PCT Pub. No.: WO2017/161160
PCT Pub. Date: Sep. 21, 2017

(65) Prior Publication Data
US 2019/0097261 A1 Mar. 28, 2019

Related U.S. Application Data

(60) Provisional application No. 62/390,051, filed on Mar. 16, 2016.

(51) Int. Cl.
*H01M 10/056* (2010.01)
*H01M 10/052* (2010.01)
(Continued)

(52) U.S. Cl.
CPC ........... *H01M 10/056* (2013.01); *H01M 4/38* (2013.01); *H01M 4/382* (2013.01);
(Continued)

(58) Field of Classification Search
None
See application file for complete search history.

(56) References Cited

U.S. PATENT DOCUMENTS

| 6,143,216 A | 11/2000 | Loch et al. |
| 6,225,374 B1 | 5/2001 | Vaia et al. |

(Continued)

FOREIGN PATENT DOCUMENTS

| CN | 105742700 | 7/2016 |
| JP | 2013/243058 A | 12/2013 |

(Continued)

OTHER PUBLICATIONS

JPH10-12269 English translation. Yamazaki et al. Japan. Jan. 16, 1998. (Year: 1998).*

(Continued)

*Primary Examiner* — Christopher P Domone
(74) *Attorney, Agent, or Firm* — Thorpe North & Western, LLP

(57) ABSTRACT

A composite solid electrolyte (100) for lithium batteries can include a solid polymer (110), phyllosilicate nanoparticles (120) distributed in the solid polymer, and a lithium salt (130) distributed in the solid polymer. In one example, the composite solid electrolyte can be used in a solid state lithium battery cell (400) made up of composite solid electrolyte, an anode (420) containing lithium in contact with a first surface of the composite solid electrolyte, and a cathode (430) in contact with a second surface of the composite solid electrolyte.

20 Claims, 19 Drawing Sheets

(51) Int. Cl.
*H01M 10/0585* (2010.01)
*H01M 4/38* (2006.01)
*H01M 4/02* (2006.01)

(52) U.S. Cl.
CPC ..... *H01M 10/052* (2013.01); *H01M 10/0585* (2013.01); *H01M 2004/027* (2013.01); *H01M 2300/0071* (2013.01); *H01M 2300/0082* (2013.01); *H01M 2300/0091* (2013.01); *Y02T 10/70* (2013.01)

(56) References Cited

U.S. PATENT DOCUMENTS

| | | | |
|---|---|---|---|
| 6,746,803 | B1 | 6/2004 | Bauer et al. |
| 7,077,983 | B2 | 7/2006 | Sandi-Tapia et al. |
| 7,399,556 | B2 | 7/2008 | Lee et al. |
| 7,745,052 | B2 | 6/2010 | Paulsen |
| 8,334,070 | B2 | 12/2012 | Ryu et al. |
| 8,409,746 | B2 | 4/2013 | Yong et al. |
| 8,513,519 | B2 | 8/2013 | Lin et al. |
| 9,437,900 | B2 | 9/2016 | Yeh et al. |
| 2003/0143467 | A1 | 7/2003 | Riley et al. |
| 2004/0197663 | A1 | 10/2004 | Mohwald et al. |
| 2005/0106469 | A1 | 5/2005 | Kawai et al. |
| 2005/0274000 | A1 | 12/2005 | Oh et al. |
| 2006/0293430 | A1 | 12/2006 | Wang et al. |
| 2007/0059577 | A1 | 3/2007 | Takeuchi et al. |
| 2012/0237838 | A1 | 9/2012 | Uesaka |
| 2013/0189592 | A1 | 7/2013 | Roumi et al. |
| 2014/0050973 | A1 | 2/2014 | Manthiram et al. |
| 2014/0131271 | A1 | 5/2014 | Wu et al. |
| 2015/0099185 | A1 | 4/2015 | Joo et al. |
| 2016/0043429 | A1 | 2/2016 | Hatta et al. |
| 2016/0064770 | A1 | 3/2016 | Lee et al. |
| 2016/0064785 | A1 | 3/2016 | Kim et al. |
| 2016/0079641 | A1 | 3/2016 | Kim et al. |
| 2016/0168346 | A1* | 6/2016 | Kamada .......... H01G 9/02 429/492 |
| 2016/0233474 | A1 | 8/2016 | Kagami et al. |
| 2016/0248100 | A1* | 8/2016 | Joo .......... H01M 4/405 |
| 2016/0322685 | A1 | 11/2016 | Choi |
| 2016/0336618 | A1* | 11/2016 | Lee .......... H01M 10/0565 |
| 2016/0344079 | A1 | 11/2016 | Kim et al. |

FOREIGN PATENT DOCUMENTS

| | | |
|---|---|---|
| WO | WO 98/44576 A1 | 10/1998 |
| WO | WO 99/19921 A1 | 4/1999 |
| WO | WO 00/38262 A1 | 6/2000 |
| WO | WO 00/38263 A1 | 6/2000 |
| WO | WO 01/99220 A1 | 6/2000 |
| WO | WO 2008/007814 A1 | 1/2008 |
| WO | WO 2015/084945 A1 | 6/2015 |

OTHER PUBLICATIONS

Eastman.; "A Case Study: Polymer-Clay Composites." Materials World Modules—Department of Chemistry; Retrieved from http://materialsworld.utep.edu/Modules/Composite/Polymer%20Clay%20Composites/Polymer%20Clay%20Composites.htm on Jan. 12, 2017; 5 Pages.

Fix et al.; "Application of Inhibitor-Loaded Halloysite nanotubes in Active Anti-Corrosive coatings." Advanced Functional Materials; Wiley Online Library; vol. 13, Issue 11; Jun. 9, 2009; pp. 1720-1727.

Kurian et al.; "Single-Ion Conducting Polymer-Silicate Nanocomposite Electrolytes for Lithium Battery Applications." Electrochimica Acta; Elsevier; vol. 50, Issue 10; Mar. 15, 2005; pp. 2125-2134.

Lin et al.; "Natural Halloysite nano-Clay Electrolyte for Advanced All-Solid-State Lithium-Sulfur Batteries." Nano Energy; Elsevier; vol. 31; Jan. 2017; pp. 478-485.

Ma et al.; "Effect of Montmorillonite on the Ionic Conductive and Electrochemical Properties of a Composite Solid Polymer Electrolyte Based on Polyvinylidenedifluoride/Polyvinyl Alcohol Matrix for Lithium Ion Batteries." Electrochimica Acta;Elsevier; vol. 187; Jan. 2016; pp. 535-542.

Meneghetti.; "Synthesis and Properties of Rubber-Clay Nanocomposites." Department of Chemical Engineering; Case Western Reserve University; Jan. 2005; 203 Pages.

Miller et al.; "Surface Characteristics of Kaolinite and Other Selected Two Layer Silicate Minerals." The Canadian Journal of Chemical Engineering; Wiley; vol. 85, Issue 5; Oct. 2007; pp. 617-624.

PCT Application No. PCT/US17/22774, Filing Date Mar. 16, 2017; Jan D. Miller; International Search Report; dated Jun. 12, 2017; 11 Pages.

Polu et al.; "Nanocomposite Solid Polymer Electrolytes Based on Poly(ethyleneoxide)/POSS-PEG (n=13.3) Hybrid Nanoparticles for Lithium Ion Batteries." Journal of Industrial and Engineering Chemistry; Elsevier; vol. 31; Nov. 25, 2015; pp. 323-329.

Riley.; "Hectorite-Based Nanocomposite Electrolytes for Lithium-Ion Batteries." Department of Chemical Engineering, Raleigh, NC; Mar. 2002; 279 Pages.

Sandi et al.; "Characterization of Polymer Nanocomposites Used in Rechargeable Systems." Fuel Chemistry Division Preprints; vol. 48, Issue 1; 2003; pp. 483-484.

Wang et al.; "Poly(Vinylidene Fluoride-Hexafluoropropylene)/Organo-Montmorillonite Clays Nanocomposite Lithium Polymer Electrolytes." Electrochimica Acta; Elsevier; vol. 49, Issue 21; Sep. 1, 2004; pp. 3595-3602.

Yang et al.; "New insight Into PEO Modified Inner Surface of HNTs and its Nano-Confinement within Nanotube." Journals of Materials Science; Springer; vol. 49, Issue 12; Jun. 2014; pp. 4270-4278.

Yoon et al.; "Polycarbonate Nanocomposites. Part 1. Effect of Organoclay Structure on Morphology and Properties." Polymer; Elsevier; vol. 44, Issue 18; Aug. 2003; pp. 5323-5339.

Zhu et al.; "Degradable cellulose Acetate/Poly-L-Lactic Acid/ halloysite nanotube Composite Nanofiber Membranes with Outstanding Performance for Gel polymer Electrolytes." Journal of Materials Chemistry A; Royal Society of Chemistry; vol. 4, Issue 31; Jul. 5, 2016; pp. 12136-12143.

\* cited by examiner

COMPOSITE SOLID ELECTROLYTES FOR LITHIUM BATTERIES

RELATED APPLICATION

This application claims priority to U.S. Provisional Patent Application No. 62/390,051 filed Mar. 16, 2016 which is incorporated herein by reference.

BACKGROUND

Lithium ion (Li-ion) battery technology has been applied in portable electronic devices for many years. More recently, Li-ion batteries have been used in transportation systems such as hybrid and electric vehicles. These markets present different challenges in battery cell design, the former requiring generally higher power density, and the latter requiring higher energy density for greater degrees of vehicle electrification. However, the need for improved conductivity and diffusivity are common to both markets. Conventional liquid or gel electrolytes can provide satisfactory performance. Liquid and gel electrolytes can also provide good contact with electrodes and accommodate volume changes in the electrodes during charging and discharging of the battery. However, solvent leakage and flammability of conventional liquid electrolytes create safety and reliability concerns.

The use of a solid polymer electrolyte instead of the conventional liquid or gel electrolyte can drastically improve the safety aspects of a Li-ion battery. However, PEO-based (polyethylene oxide-based) solid electrolytes often do not meet functional performance requirements. For example, at low temperatures, the conductivity of solid electrolytes can be poor due to the presence of crystalline PEO segments, which restricts the lithium ion mobility. This limits the useful operating temperature of Li-ion polymer batteries employing such solid electrolytes to between 70° C. and 100° C., which excludes the use of solid polymer-based batteries in room temperature applications. Therefore, improvements to Li-ion battery performance continues to be sought.

SUMMARY

A composite solid electrolyte for lithium batteries can include a solid polymer, phyllosilicate nanoparticles distributed in the solid polymer, and a lithium salt distributed in the solid polymer. In some examples, the solid polymer can include polyethylene oxide. In other examples, the composite solid electrolyte can be formed as a thin film having thickness from 1 μm to 300 μm and in some cases from 10 μm to 100 μm.

In certain examples, the phyllosilicate nanoparticles can be in the form of nanotubes, nanoplatelets, or a combination thereof. Additionally, the phyllosilicate nanoparticles can include an aluminum based phyllosilicate, a magnesium based phyllosilicate, or a combination thereof. The phyllosilicate nanoparticles can include halloysite, kaolinite, chrysotile, and antigorite, talc, pyrophyllite, montmorillonite, chlorite, mica, sepiolite, serpentine, and combinations thereof. In one specific aspect, the phyllosilicate nanoparticles can be bilayer phyllosilicate nanoparticles. Bilayer phyllosilicate nanoparticles include halloysite, kaolinite, chrysotile, and antigorite, or a combination thereof. In one example, the bilayer phyllosilicate nanoparticles can be halloysite nanotubes.

In further examples, the bilayer phyllosilicate nanoparticles can be chemically modified. In a particular example, the bilayer phyllosilicate nanoparticles can be in the form of nanotubes having a polymer electrolyte impregnated in an interior volume of the nanotubes. In some cases, the polymer electrolyte can be a liquid. In a further example, the composite solid electrolyte can have a lithium ion conductivity of at least $10^{-4}$ S cm$^{-1}$ at 25° C. In another example, the lithium salt can be LiTFSI (lithium bis-trifluoromethane-sulfonimide). In a further example, the weight ratio of LiTFSI to the bilayer phyllosilicate nanoparticles can be from 2:1 to 5:1. In another example, a molar ratio of ethylene oxide units in the polymer to lithium ions in the composite solid electrolyte can be from 8:1 to 25:1. In a particular example, the amount of bilayer phyllosilicate nanoparticles present can be from 0.5 wt % to 30 wt % and in some cases from 5 wt % to 10 wt %.

A solid state lithium battery cell can be formed from a composite solid electrolyte layer, an anode in contact with a first surface of the composite solid electrolyte layer, and a cathode in contact with a second surface of the composite solid electrolyte layer. The composite solid electrolyte layer can include a solid polymer, bilayer phyllosilicate nanoparticles distributed in the solid polymer, and a lithium salt distributed in the solid polymer. The anode can contain lithium. In a particular example, the anode can be lithium metal and the cathode can include sulfur. In a further example, the solid polymer can include polyethylene oxide and the bilayer phyllosilicate nanoparticles can be halloysite nanotubes.

The present invention also extends to methods of making a composite solid electrolyte for lithium batteries. In one example, bilayer phyllosilicate nanoparticles can be dispersed in a solvent. A solid polymer can also be dissolved in the solvent. A lithium salt can be dissolved in the solvent as well. The solvent can be removed to form the composite solid electrolyte film.

Additional features and advantages of these principles will be apparent from the following detailed description, which illustrates, by way of example, features of the invention.

Figure 1:
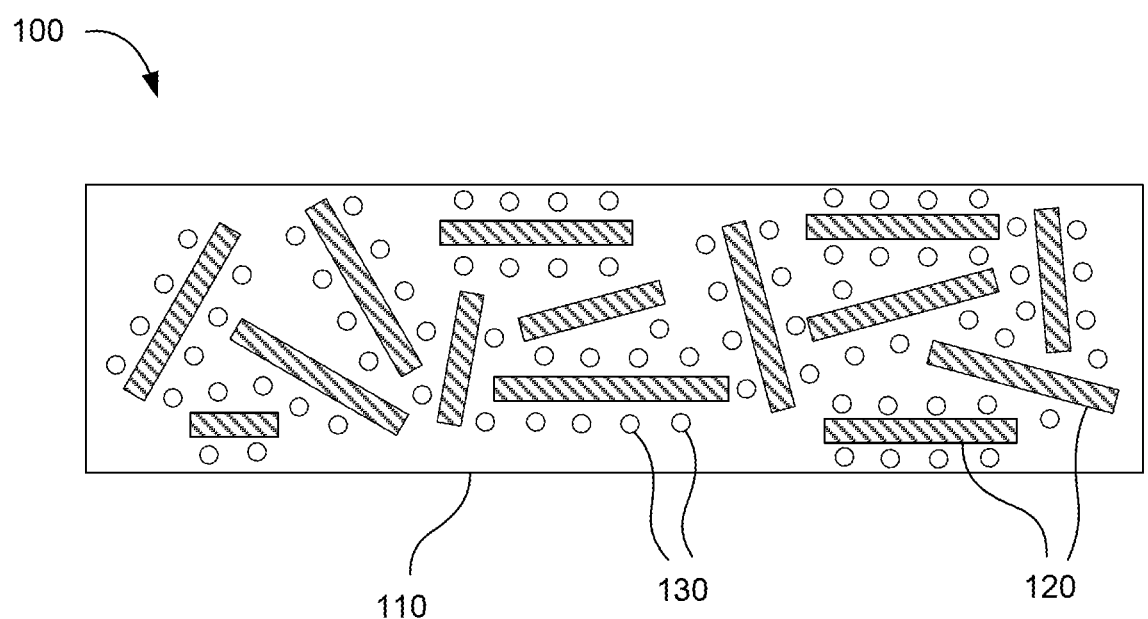
FIG. 1 is a schematic of a composite solid electrolyte in accordance with an example of the present technology.

It should be noted that the figures are merely exemplary of several embodiments and no limitations on the scope of the present invention are intended thereby. Further, the figures are generally not drawn to scale, but are drafted for purposes of convenience and clarity in illustrating various aspects of the invention.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

Definitions

In describing and claiming the present invention, the following terminology will be used.

The singular forms "a," "an," and "the" include plural references unless the context clearly dictates otherwise. Thus, for example, reference to "a nanoparticle" includes reference to one or more of such structures, "a salt" includes reference to one or more of such materials, and "a mixing step" refers to one or more of such steps.

As used herein, "bilayer phyllosilicate" refers to a phyllosilicate material having a crystal structure with a positively charged surface on one face and a negatively charged surface on an opposite face. In some cases bilayer phyllosilicates can form flat sheets with oppositely charged top and bottom faces, or nanotubes with oppositely charged interior and exterior surfaces. Phyllosilicates in general are silicate minerals containing silicate tetrahedrons arranged in sheets. Non-limiting examples of phyllosilicates include halloysite, kaolinite, chrysotile, antigorite, talc, pyrophyllite, montmorillonite, chlorite, mica, sepiolite, serpentine, and others. In some cases, the phyllosilicates are natural unmodified nanomaterials. Bilayer phyllosilicates include halloysite, kaolinite, chrysotile, and antigorite.

As used herein, "nanoparticle" refers to a particle having a dimension in the nanoscale, such as from about 1 nm to about 1000 nm. Nanoparticles can include a variety of morphologies, such as nanospheres, nanoplatelets, nanotubes, and others.

As used herein, "lithium ion transference number" or "$t^+$" is defined as follows. An electrolyte is tested in a symmetric cell with lithium anode and lithium cathode surrounding the electrolyte. When a constant polarization voltage of 10 mV is applied to the cell, a current is measured from the initial value to a steady-state value after 4 hours. AC impedance plots of the film before and after polarization are obtained. The frequency range is from 300 kHz to 10 Hz and the signal amplitude is 10 mV. The $t^+$ is given by the following expression:

$$t^+ = \frac{I_S(V - I_0 R_0)}{I_0(V - I_S R_S)}$$

where V is the DC voltage applied to the cell; $R_0$ and $R_S$ are the initial and steady-state resistances of the passivating layer, respectively; and $I_0$ and $I_S$ are the initial and steady-state current, respectively.

As used herein, "conductivity" refers to lithium ion conductivity unless otherwise stated. Conductivity is typically given in units of siemens per centimeter (S cm$^{-1}$). The conductivity ($\sigma$) is:

$$\sigma = \frac{l}{S R_b}$$

where l is the thickness of the electrolyte, $R_b$ is the resistance of the electrolyte, and S is the area of the electrodes used to test the resistance of the electrolyte. The ionic conductivity values described herein were obtained by complex plane impedance plots between 25° C. and 100° C. with an impedance analyzer. The composite solid electrolyte film was sandwiched between a stainless steel (SS) disk with diameter d=1.6 cm and the positive shell of a 2025 coin cell to form a symmetric stainless steel/electrolyte/stainless steel cell for testing.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and 200, but also to include individual sizes such as 2, 3, 4, and sub-ranges such as 10 to 50, 20 to 100, etc.

As used herein, the term "at least one of" is intended to be synonymous with "one or more of" For example, "at least one of A, B and C" explicitly includes only A, only B, only C, and combinations of each.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Composite Solid Electrolytes

The present disclosure describes composite solid electrolytes that can provide the benefits of solid polymer electrolytes while also providing adequate lithium ion conductivity to make batteries with good performance. The composite solid electrolyte can be made in the form of a flexible thin membrane. This electrolyte can be advantageously used for solid-state micro-scale lithium batteries due to the small size and weight of the electrolyte. Similar advantages can be gained by co-locating micro-scale batteries and integrated circuits on a single chip. The composite solid electrolyte can also make battery cells safer by eliminating flammable and reactive liquid electrolytes. Thus, the electrolyte can potentially be used in safe, lightweight batteries for electric vehicles. Finally, the electrolyte can have adequate lithium ion conductivity across a wide range of temperatures, including room temperature. This allows for batteries that can be used in a variety of commercial applications.

In one example of the present technology, a composite solid electrolyte can include a solid polymer, phyllosilicate nanoparticles distributed in the solid polymer, and a lithium salt distributed in the solid polymer. FIG. 1 shows a schematic cross section (not to scale) of one example of a composite solid electrolyte 100. The composite solid electrolyte includes a matrix of a solid polymer 110 with phyllosilicate nanoparticles 120 and lithium ions 130 dispersed therein. This combination of materials can have good ion conductivity at room temperature for use in a lithium ion battery.

In certain examples, the solid polymer of the composite solid electrolyte can be a polyether such as polyethylene oxide or polypropylene oxide. Non-limiting examples of suitable solid polymers can include polymethyl methacrylate, polycarbonate, polysiloxane, starch, sugar, fiber, polyvinyl alcohol, polyphosphazene and polystyrene. Such polymers can sometimes be used as polymeric electrolytes without the addition of the phyllosilicate nanoparticles. However, the polymers can have crystallinity at low temperatures that reduces the conductivity of the polymer at low temperatures. Thus, these polymers may be usable as electrolytes only at high temperatures, such as 70° C. or higher. Without being bound to a particular mechanism, it is believed that adding phyllosilicate nanoparticles to the polymer can inhibit the crystallization of the polymer chains, which leads to increased low temperature conductivity.

Figure 2:
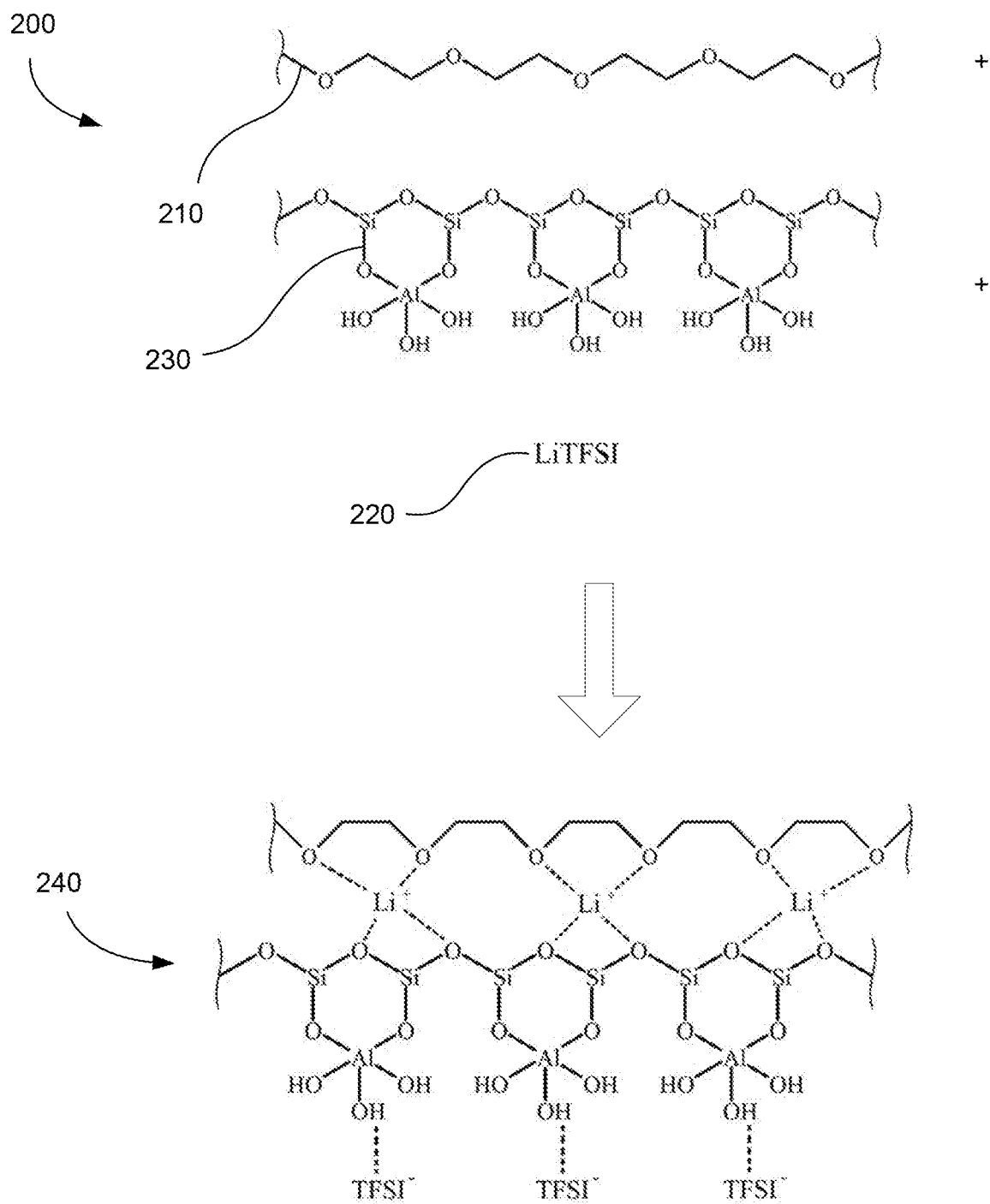
FIG. 2 shows an example chemical mechanism of forming a composite solid electrolyte in accordance with an example of the present technology.

Additionally, the differing charged surfaces of the bilayer structure of the phyllosilicate can further improve low temperature and high temperature ionic conductivity over and above the crystallization inhibiting effect described above. The charge properties of bilayer phyllosilicates have surprisingly been found to provide even better low temperature and high temperature ionic conductivity compared to other inorganic particles that have been added to polymeric electrolytes. Without being bound to a specific mechanism, it is believed that specific interactions occur between surface groups of the bilayer phyllosilicate and the lithium salt and polymer. These interactions can be interpreted in terms of Lewis acid-base group interactions. One example of this mechanism 200 is shown in FIG. 2. In this example, a segment of polyethylene oxide (PEO) 210 is shown being combined with lithium bis-trifluoromethanesulfonimide (LiTFSI) 220, and a segment of a halloysite nanotube 230. Combining these materials forms the composite 240.

In one particular aspect, the phyllosilicates can be bilayer phyllosilicates. The bilayer phyllosilicates can generally be either planar (e.g. kaolinite, antigorite, etc) or nanotubular (e.g. halloysite, chrysotile, etc). The halloysite nanotube has a bilayer structure with the chemical composition $Al_2Si_2O_5(OH)_4$. The exterior face of the nanotube contains $SiO_2$ and the interior face contains $Al(OH)_3$. These faces exhibit a difference in the sign of surface charge for certain conditions, which provide more Lewis acid-base interaction sites. Lewis acid-base sites interact with the ionic species $Li^+$ and $TFSI^-$, thus lowering ionic coupling. This can promote salt dissociation via a sort of "ion-halloysite-nanotube complex" formation. As shown in FIG. 2, the $Li^+$ ions can complex with the exterior surface of the nanotube while the $TFSI^-$ ions can complex with the interior surface. The ethylene oxide units on PEO also have an abundance of lone-pair electrons that can interact with the Li+ ions on the outer HNT surface, as the polymer becomes organized and conformed to the HNT nanoparticles. The Lewis acid-base interactions among HNT, LiTFSI, and PEO effectively order the ions into 3D channels. These interactions can significantly shorten the distance of free Li+ ion transfer, lower ionic coupling, disturb the PEO crystallinity, decrease the phase transition temperature, and provide a high-speed freeway for lithium ion transport through the composite solid electrolyte.

Halloysite nanotubes (HNTs) are based on aluminosilicate clay nanosheets that naturally occur as hollow tubular structures. This mineral can be mined from deposits in Utah in the United States as well as in other deposits around the world. The ideal unit formula for halloysite is $Al_2Si_2O_5(OH)_4 \cdot nH_2O$ (n=0 for halloysite-(7 Å) and n=2 for hydrated halloysite-(10 Å). Unlike other nano-structured clays that must be exfoliated, HNTs naturally occur with typical dimensions of 10-50 nm for the outer diameter and 5-20 nm for the inner diameter, with a length for 50 to 1000 nm. As is the case for many clays, the halloysite structure has two components: (1) sheets of corner shared silica tetrahedra and (2) sheets of edge shared alumina octahedra. The layers building up the final structure are composed by one of each of these sheets so that the crystal structure of halloysite is described as 1:1 dioctahedral layered silicate. Compared to other nanomaterials, such as carbon nanotubes, graphene etc., the halloysite nanotubes have several advantages. For example halloysite nanotubes are a natural nanotube material of low cost having excellent chemical and physical stability.

Other bilayer phyllosilicate nanoclays can provide similar improvement in ionic conductivity because they have similar chemical composition. For example, kaolinite is a bilayer phyllosilicate clay and has the same chemical composition ($Al_2Si_2O_5(OH)_4$) as that of halloysite. Kaolinite can also provide improvement in conductivity when kaolinite nanoparticles are used to synthesize the nanocomposite electrolyte.

In some examples, modification of phyllosilicates can further improve the ionic conductivity. Therefore, in addition to halloysite nanotubes, other phyllosilicate structures and modification of such structures can be used for nanocomposite electrolytes in lithium ion batteries. In various examples, the phyllosilicates can be bilayer, trilayer or mixed layer structures and include both tubular structures and flat, layered structures. In certain examples, the phyllosilicates can be either aluminum or magnesium phyllosilicates which can be modified to promote the transport of lithium ions. In one such example, the modification can include, but is not limited to, replacement of interlayer cations with lithium ions.

Non-limiting examples of phyllosilicates that can be used in the composite solid electrolyte can include kaolinite, halloysite, chrysotile, antigorite, talc, pyrophyllite, montmorillonite, chlorite, mica, sepiolite, serpentine, and others.

Composite solid electrolytes according to the present technology can be formed to have advantageous properties for use in solid state batteries. For example, the composite solid electrolyte can have good ionic conductivity, lithium ion transference number, weight, chemical stability, thermal stability, mechanical stability, and flexibility. The properties can be influenced by the composition of the composite solid electrolyte. The type of polymer, lithium salt, and bilayer phyllosilicate used can affect the properties of the resulting electrolyte. The relative amounts of these components can also affect the properties.

In certain examples, the composite solid electrolyte can include from 1 wt % to 30 wt % bilayer phyllosilicate nanoparticles. In more specific examples, the composite solid electrolyte can include from 5 wt % to 15 wt % bilayer phyllosilicate nanoparticles. The ratio of polymer to lithium salt can also affect the properties of the electrolyte. For polyether polymers, the molar ratio of monomer units to lithium ions can be calculated. For example, if the polymer is polyethylene oxide, then the molar ratio of ethylene oxide (EO) units to lithium ions from the lithium salt can be calculated. In some examples, this EO:Li ratio can be from 8:1 to 25:1. In more specific examples, the EO:Li ratio can be from 10:1 to 20:1. For other polymers, a ratio of monomer units to lithium ions can be in the same ranges.

In various examples, the composite solid electrolyte can comprise the solid polymer, lithium salt, and bilayer phyllosilicate nanoparticles as well as additional additives. In some examples, the composite solid electrolyte can consist of or consist essentially of the solid polymer, lithium salt, and bilayer phyllosilicate nanoparticles.

In a particular example, the bilayer phyllosilicate nanoparticles can be halloysite nanotubes, the polymer can be polyethylene oxide, and the lithium salt can be LiTFSI. The amount of halloysite nanotubes in the composite solid electrolyte can be about 10 wt %. The remainder of the composite solid electrolyte can consist of polyethylene oxide and LiTFSI. The molar ratio EO:Li in this example can be about 15:1.

In other examples, the ionic conductivity of the composite solid electrolyte can be affected by using phyllosilicate nanotubes grafted with short chain functional groups. The functional groups can bind with the inside atoms of the nanotube and occupy the volume within the nanotubes, providing a high ionic conductivity pathway for ions within the nanotubes. The short chain functional group can be carbonate, ethylene oxide, and phosphazene, although other groups can be suitable.

As mentioned above, the composite solid electrolyte can be formed to have useful properties for use in lithium batteries. In some examples, the composite solid electrolyte can have a sufficient ionic conductivity across a range of temperatures, including room temperature, to be useful in lithium batteries. In one example, the composite solid electrolyte can have an ionic conductivity of greater than $10^{-4}$ S $cm^{-1}$ at 25° C. The ionic conductivity can also increase with increasing temperature. In a further example, the composite solid electrolyte can have an ionic conductivity of greater than $10^{-3}$ at 60° C.

The composite solid electrolytes according to the present technology can also have a suitable lithium ion transference number ($t^+$). In some examples, the lithium ion transference number can be from 0.3 to 0.5. This can compare favorably to a pure PEO electrolyte, which can have a lithium ion transference number from about 0.1 to about 0.25.

Electrochemical stability of the composite solid electrolyte can be characterized by the decomposition voltage, or the highest voltage that can be applied to the electrolyte before the electrolyte chemically decomposes. In some examples, the composite solid electrolyte can have a decomposition voltage from 5 V to 7 V at 25° C. In further examples, the composite solid electrolyte can have a decomposition voltage from 4.5 V to 6 V at 100° C. The decomposition voltage of the composite solid electrolyte can compare favorably to commercially available liquid organic electrolytes, many of which decompose at around 4.2 V.

Figure 3:
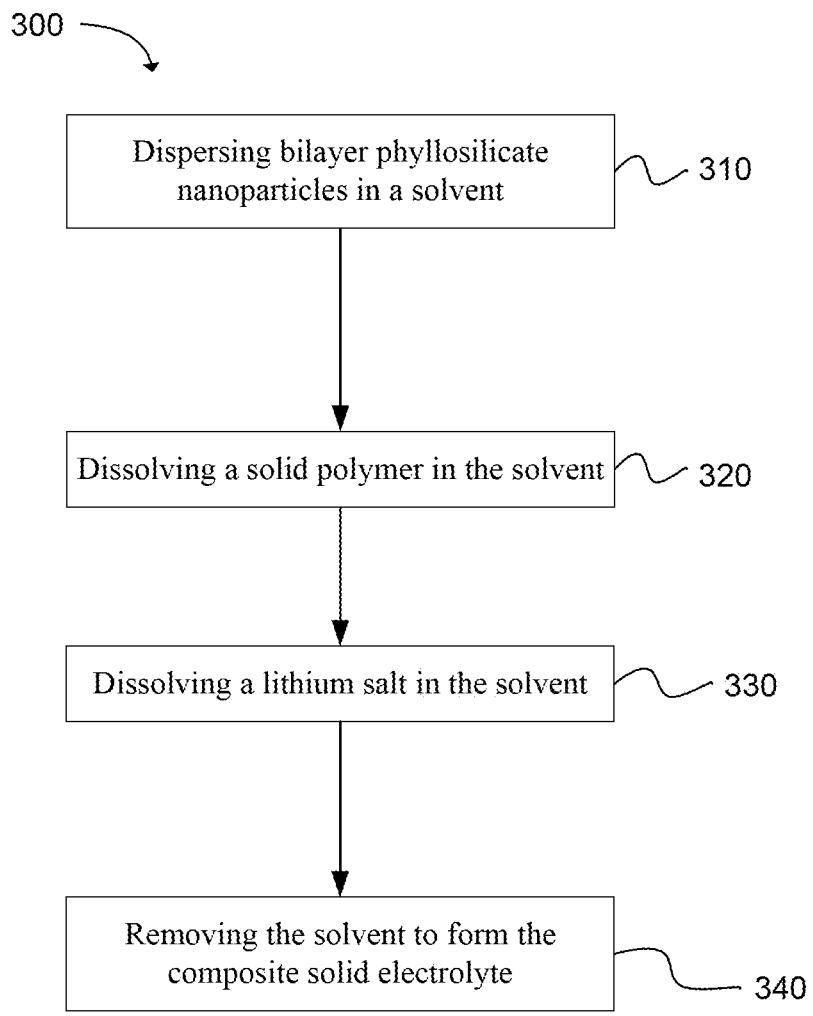
FIG. 3 is a flowchart of a method of making a composite solid electrolyte in accordance with an example of the present technology.

The present technology also extends to methods of making composite solid electrolytes. FIG. 3 shows one example of a method 300. The method includes: dispersing bilayer phyllosilicate nanoparticles in a solvent 310; dissolving a solid polymer in the solvent 320; dissolving a lithium salt in the solvent 330; and removing the solvent to form the composite solid electrolyte 340. In some non-limiting examples, the solvent can include acetonitrile, acetone, alcohol, N-methyl-2-pyrrolidone, tetrahydrofuran, pyridine, dimethyl sulfoxide and water. In a particular example, the solvent can be acetonitrile.

The amounts of solvent, bilayer phyllosilicate nanoparticles, lithium salt, and polymer mixed in this process can generally be any amounts sufficient to form a composite solid electrolyte having the desired properties. In some examples, the concentration of solids (including the phyllosilicate nanoparticles, lithium salt, and polymer) dispersed or dissolved in the solvent can be from 0.1 mg/mL to 20 mg/mL. In further examples, the concentration of solids can be from 1 mg/mL to 10 mg/mL.

The solid components can be mixed with the solvent by any suitable mixing method for a sufficient time to form a homogeneous dispersion. In one example, the solid components can be added to the solvent and the mixture can be stirred for 1 to 5 hours. In a particular example, the bilayer phyllosilicate nanoparticles can be added to the solvent first, and then stirred for 30 minutes to 1 hour. The lithium salt and polymer can then be added, and the mixture can be stirred for an additional 1 to 4 hours.

The dispersion of solid components in the solvent can be dried to form the composite solid electrolyte. In various examples, the dispersion can be molded, formed into sheets, coated on substrates, or otherwise shaped and then allowed to dry. In one example, a quantity of the dispersion can be dropped onto a flat surface and allowed to dry, forming a dried composite solid electrolyte layer. The dried layer can then be peeled off and used in a battery. Layers and sheets of the composite solid electrolyte can be cut, shaped, folded, bent, curved, and so on as convenient for forming a lithium battery electrolyte. In some examples, a composite solid electrolyte layer can be formed with the same dimensions as an anode and cathode for a battery, and then the electrolyte layer can be pressed between the anode and cathode to form a battery cell.

The present technology also encompasses solid state lithium battery cells employing the composite solid electrolytes described above. In one example, a solid state lithium battery cell can include a composite solid electrolyte layer, an anode in contact with a first surface of the composite solid electrolyte layer, and a cathode in contact with a second surface of the composite solid electrolyte layer. The composite solid electrolyte layer can include a solid polymer, bilayer phyllosilicate nanoparticles distributed in the solid polymer, and a lithium salt distributed in the solid polymer. The anode can contain lithium.

Figure 4:
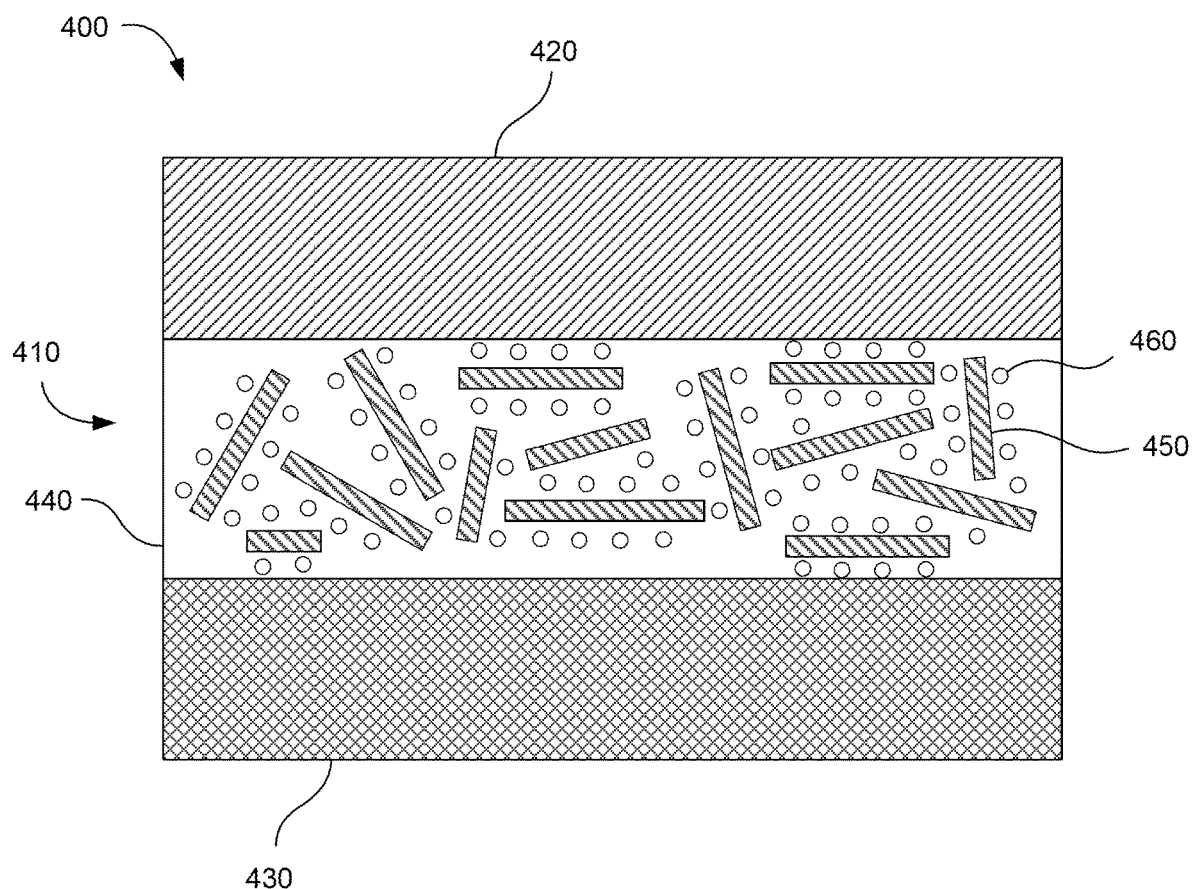
FIG. 4 is a schematic of a solid state lithium battery cell in accordance with an example of the present technology.

FIG. 4 shows one example of a solid state lithium battery cell 400 in accordance with the present technology. The battery cell includes a composite solid electrolyte 410 between an anode 420 and a cathode 430. The composite solid electrolyte is made up of a solid polymer 440 having bilayer phyllosilicate nanoparticles 450 and lithium ions 460 distributed therein.

In some examples, the anode can include lithium. In certain examples, the anode can consist of or consist essentially of lithium metal. In further examples, the cathode can comprise sulfur. In some examples, the cathode can be a sulfur composite. For example, the cathode can be made of one or more of $LiFePO_4$, $LiCoO_2$, $LiMnO_4$ and $Li(Ni_xCo_yMn_z)O_2$ while the anode can be formed of one or more of graphite, silicon, and tin.

Battery cells employing the composite solid electrolytes described herein can have good power density and energy density. In some examples, the energy density, or capacity, of a battery can decrease from an initial value to a lower value after one or more charge/discharge cycles. Typically, charging and discharging at a lower C value can preserve a higher capacity. In one example, a battery according to the present technology can have an initial discharge capacity of at least 1200 mAh $g^{-1}$ and the discharge capacity can decrease to a lower discharge capacity of at least 600 mAh $g^{-1}$ after 100 cycles at 0.1 C at 25° C. When discharged at a higher C and/or at a higher temperature, the discharge capacity can decrease more. In one example, a battery can have a reduced capacity of at least 300 mAh $g^{-1}$ after 400 cycles at 4 C and 100° C. Thus, a useful capacity can be maintained even when used at high C and high temperature.

Solid state lithium batteries according to the present technology can be made to have any suitable form factor. For example, a solid state lithium battery can be in a metal or plastic hard sided casing, a flexible polymer pouch, a cylindrical battery casing, an integrated battery formed on a microchip or circuit board, and so on. Multiple solid state lithium battery cells can be combined in series or parallel to provide more voltage and/or capacity.

Figure 5A:
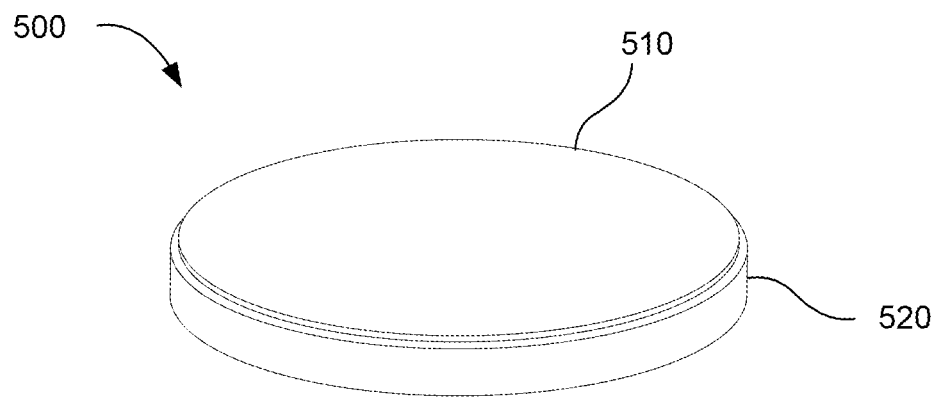
FIG. 5A is a perspective view of a coin cell solid state lithium battery in accordance with an example of the present technology.
Figure 5B:
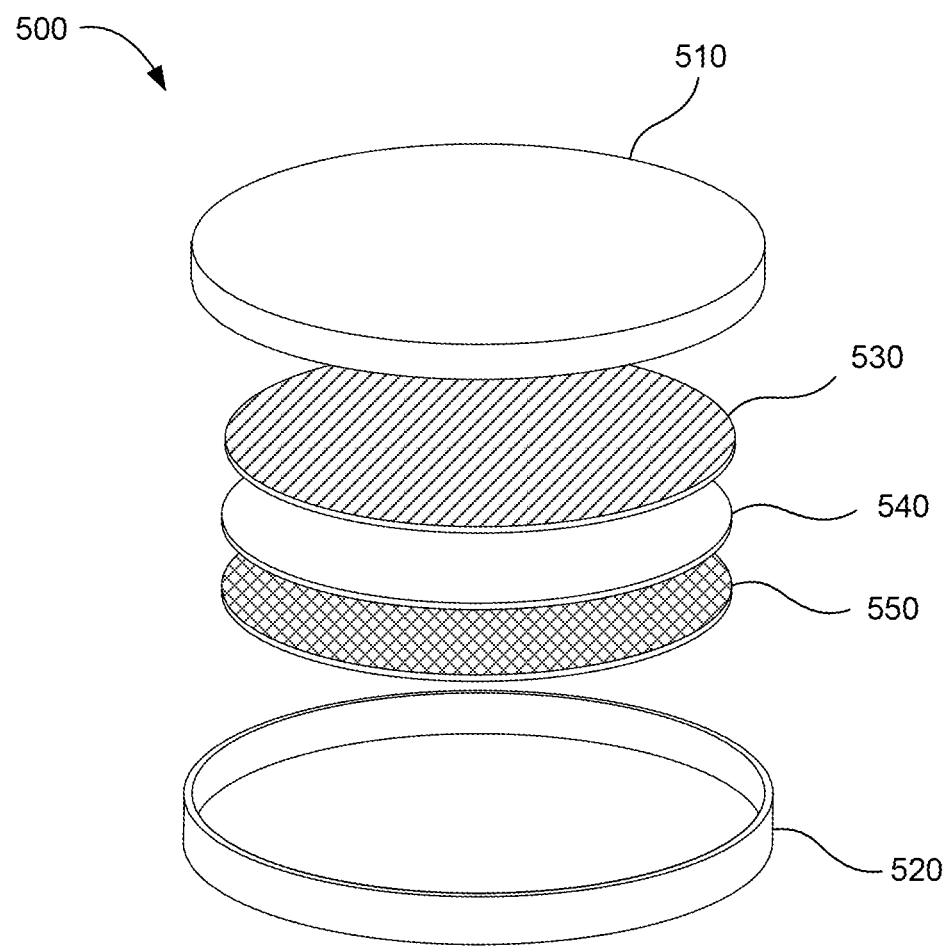
FIG. 5B is an exploded view of a coin cell solid state lithium battery in accordance with an example of the present technology.

FIGS. 5A and 5B show one example of a solid state lithium battery 500 having a coin cell form factor. The coin cell has a stainless steel anode casing 510 and a stainless steel cathode casing 520 containing the other battery components. FIG. 5B shows an exploded view, with a lithium anode 530, composite solid electrolyte layer 540, and sulfur-based cathode 550 inside the casing.

It is to be understood that the above-referenced arrangements are illustrative of the application for the principles of the present invention. Thus, while the present invention has been described above in connection with the exemplary embodiments, it will be apparent to those of ordinary skill in the art that numerous modifications and alternative arrangements can be made without departing from the principles and concepts of the invention as set forth in the claims.

EXAMPLES

Example 1: Formation of Composite Solid Electrolytes

Polyethylene oxide (PEO, MW=$4\times10^6$, Xiamen TOB New Energy Technology Company), lithium bis(trifluoromethanesulfonyl)imide (LiTFSI, 99.5%, Acros) and halloysite nanotubes (HNT, 99.5%, Sigma-Aldrich) were dried before use. HNT was dispersed in acetonitrile (CH3CN, AR grade) and stirred for 45 minutes. PEO and LiTFSI were then added and stirred for several hours to form a homogenized solution. The solution was cast and dried into a thin film in an argon filled glove box at 60° C., and a PEO+LiTFSI+HNT electrolyte thin film was made.

A series of solid electrolytes were formed using the above process with various amounts of HNT, PEO, and LiTFSI. A first series of electrolytes was formed having a EO:Li molar ratio of 15:1. The electrolytes in the first series had HNT concentrations of 0, 5, 10, 15, and 17 wt %. A second series of electrolytes was also formed having a HNT concentration of 10 wt %. In the second series, the EO:Li ratio was varied to 8:1, 10:1, 15:1, 20:1, and 25:1.

Example 2: Conductivity of Series 1

The first series of electrolytes having the EO:Li molar ratio of 15:1 was tested for ionic conductivity. The electrochemical properties of the electrolytes were measured using a Gamry electrochemical instrument. The ionic conductivities of the electrolyte films were evaluated by the complex plane impedance plots between 25° C. and 100° C. with an impedance analyzer. Each film was sandwiched between a stainless steel (SS) disk (d=1.6 cm) and the positive shell of a 2025 coin cell to form a symmetric stainless steel/electrolyte/stainless steel cell.

Figure 6:
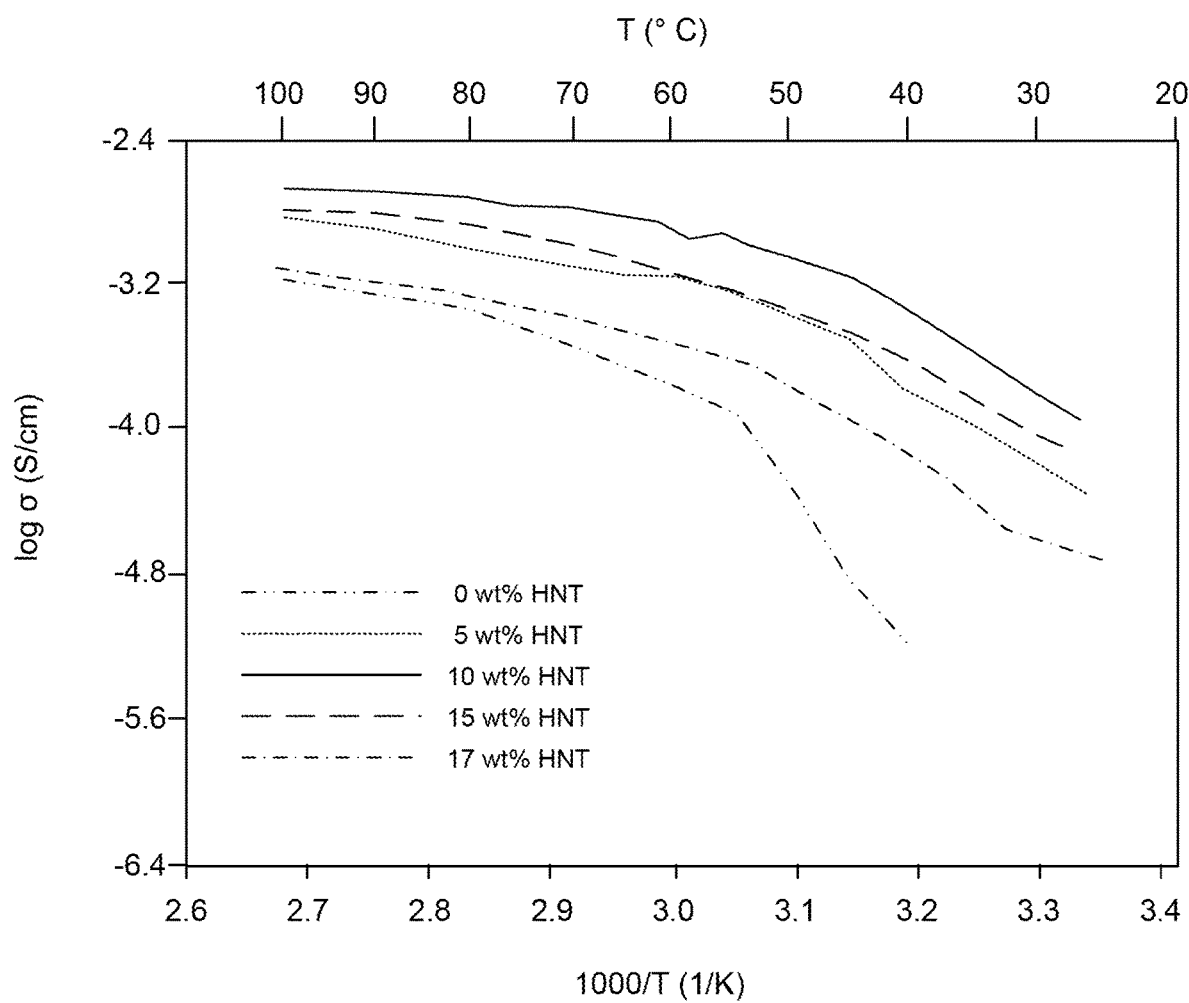
FIG. 6 is a graph of ionic conductivities of several composite solid electrolytes in accordance with an example of the present technology.

FIG. 6 shows ionic conductivities of the first series of electrolytes as a function of temperature. As seen in the figure, the electrolyte having a HNT concentration of 10 wt % had the best conductivity across the temperature range. Therefore, this HNT concentration was chosen for the electrolytes of series 2.

Ionic conductivity of the PEO based electrolyte is higher in the amorphous state than in the crystalline state. A decrease of the crystalline transition temperature will increase the ionic conductivity. Thus, the phase transition temperature was measured for the electrolytes of series 1. The experimental data in FIG. 6 were fitted by the Arrhenius equation at low temperature (linear, crystalline phase) and by the Vogel-Tamman-Fulcher (VTF) equation at high temperature (non-linear curve, amorphous phase). The phase transition temperatures can be measured at the crossing point of the two fitted lines, which are 56.9, 48.7, 42.3, 42.1 and 42.3° C., respectively for HNT concentrations of 0, 5, 10, 15 and 17 wt % when EO:Li is 15:1.

Example 3: Conductivity of Series 2

Figure 7:
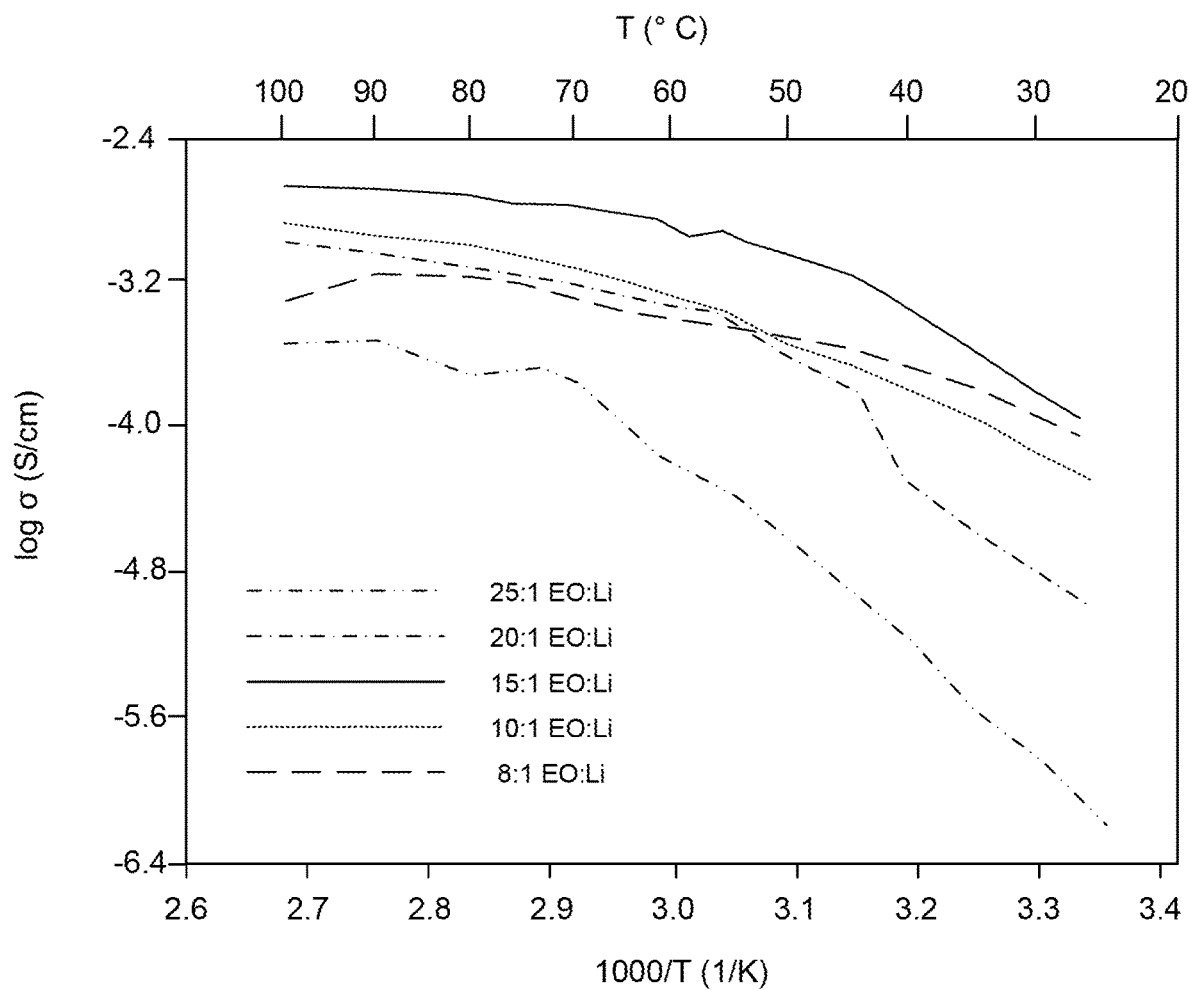
FIG. 7 is a graph of ionic conductivities of several composite solid electrolytes in accordance with an example of the present technology.

The electrochemical properties of the second series of electrolytes were measured in the same way. FIG. 7 shows ionic conductivities of the second series of electrolytes as a function of temperature. The electrolyte having a EO:Li molar ratio of 15:1 had the best ionic conductivity across the temperature range.

Phase transitions temperatures for the electrolytes of series 2 were calculated as described above. The phase transition temperatures were found to be 62.6, 47.2 and 42.3° C. for EO:Li ratios of 25:1, 20:1 and 15:1, respectively. For EO:Li ratios of 10:1 and 8:1, the curves became smooth and no such inflection points for the phase transition were found, indicating that a homogeneous and amorphous phase exists. However, the ionic conductivity at EO:Li=15:1 is clearly higher than at EO:Li=8:1.

As the temperature increases, the ionic conductivity of the PEO+LiTFSI+HNT electrolyte increases more steadily than that of PEO+LiTFSI. The highest ionic conductivity was attained with the presence of 10 wt % HNT and an EO:Li molar ratio of 15:1. The ionic conductivity of this electrolyte at several temperatures was directly compared with the ionic conductivity of the 0 wt % HNT electrolyte at EO:Li=15:1. The comparison is shown in Table 1:

TABLE 1

| Temperature (° C.) | Ionic Conductivity (S cm$^{-1}$) | |
| --- | --- | --- |
| | PEO + LiTFSI | PEO + LiTFSI + HNT |
| 25 | 6.35 × 10$^{-7}$ | 1.11 × 10$^{-4}$ |
| 60 | 1.73 × 10$^{-4}$ | 1.34 × 10$^{-3}$ |
| 100 | 6.77 × 10$^{-4}$ | 2.14 × 10$^{-3}$ |

Example 4: Lithium Ion Transference Number

Figure 8:
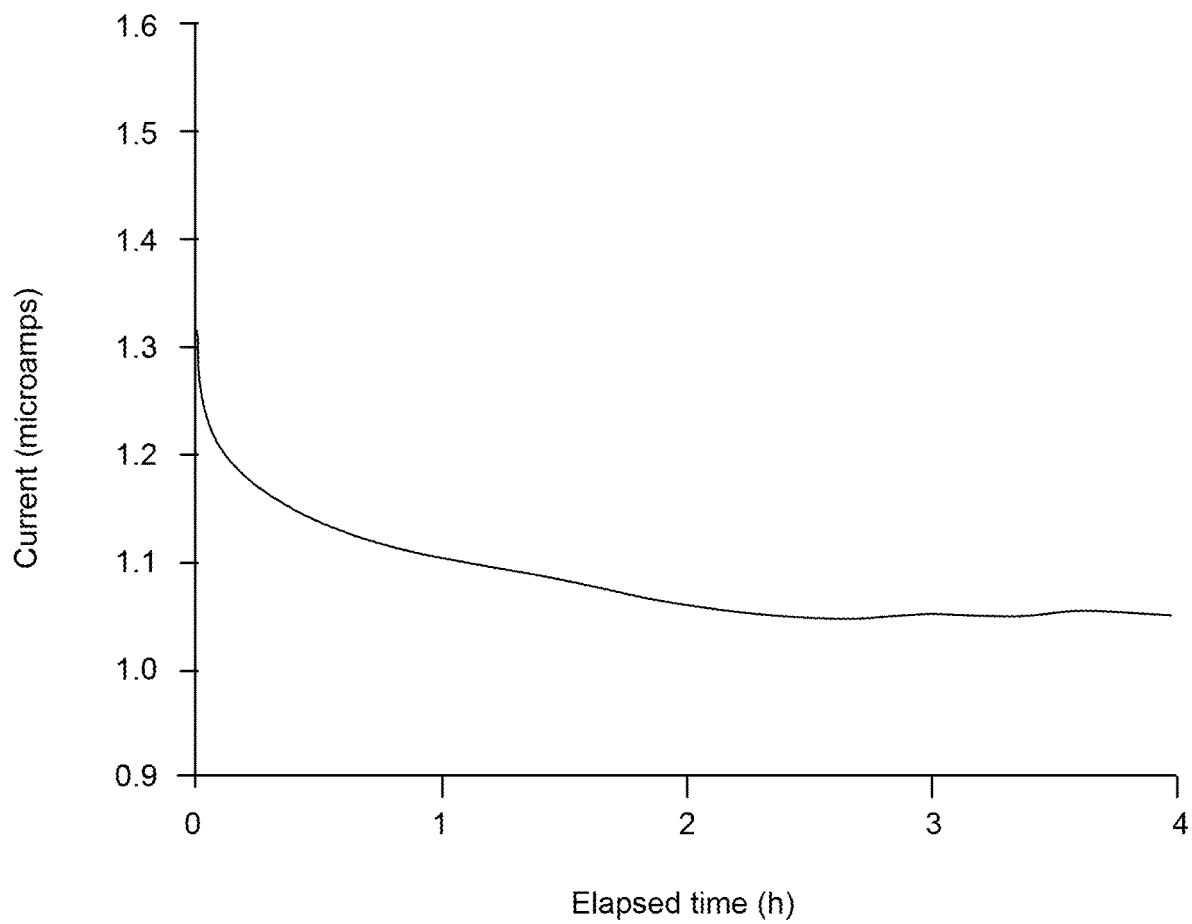
FIG. 8 is a graph of current flowing through a Li/PEO+ LiTFSI+HNT/Li cell at a constant polarization voltage of 10 mV, in accordance with an example of the present technology.

The Li+ ion transference number (t+) of the electrolyte film was tested in a symmetric cell (Li/PEO+LiTFSI+HNT/Li). When a constant polarization voltage of 10 mV was applied to the cell, a current was measured from the initial value to a steady-state value after 4 h. FIG. 8 shows the current of this cell as a function of time. At the beginning of the polarization, both Li+ cations and anions move and contribute to the current. While at the steady state, only Li+ ions transport from one electrode to the other. The lithium ion transference number value measured for the HNT nanocomposite electrolyte is 0.4, which is 4 times higher than that of pure PEO at room temperature (0.1 measured with the same method). The value for the pure PEO electrolyte is usually in the range of 0.1-0.25. The high Li+ ionic conductivity is attributed to the HNT contribution.

Example 5: Crystallization Behavior

In order to further investigate the relationship between the ionic conductivity and the amorphous phase, an optical microscope at a magnification of 50 was used to directly observe the crystallization behavior. The crystal size in PEO+LiTFSI was reduced after adding LiTFSI. With the addition of HNT to PEO+LiTFSI, the size is further reduced. Hence, the decreases in crystal size can contribute to the increase in ionic conductivity.

Example 6: Electrochemical, Thermal, and Mechanical Stability

Figure 9:
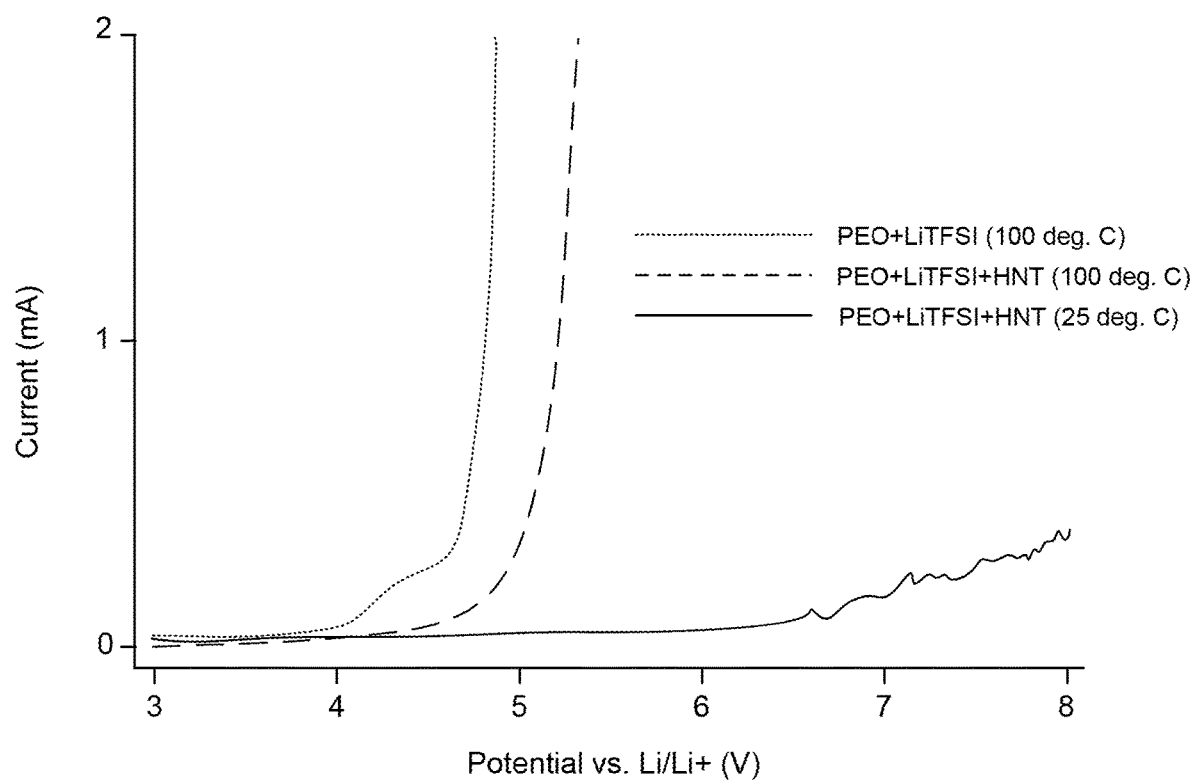
FIG. 9 is a graph of linear sweep voltammetry of Li/PEO+ LiTFSI+HNT/SS cells at 25° C. and 100° C., and Li/PEO+ LiTFSI/SS at 100° C. at a rate of 10 mV/s, in accordance with an example of the present technology.

Linear sweep voltammetry, thermal analysis and the stress-strain characteristics of the solid polymer electrolytes were tested to evaluate the electrochemical, thermal and mechanical stability, respectively. FIG. 9 shows linear sweep voltammetry of Li/PEO+LiTFSI+HNT/SS cells at 25° C. and 100° C., and Li/PEO+LiTFSI/SS at 100° C. at a rate of 10 mV/s. The HNT based electrolyte was stable up to 6.35 V and 4.78 V at 25° C. and 100° C., respectively. Both of these values were higher than the decomposition voltage of commercial liquid organic electrolytes (~4.2 V). As a comparison, the steady voltage of the PEO+LiTFSI electrolyte was 4.52 V at 100° C. The electrochemical stability was greatly enhanced by adding HNT.

Figure 10:
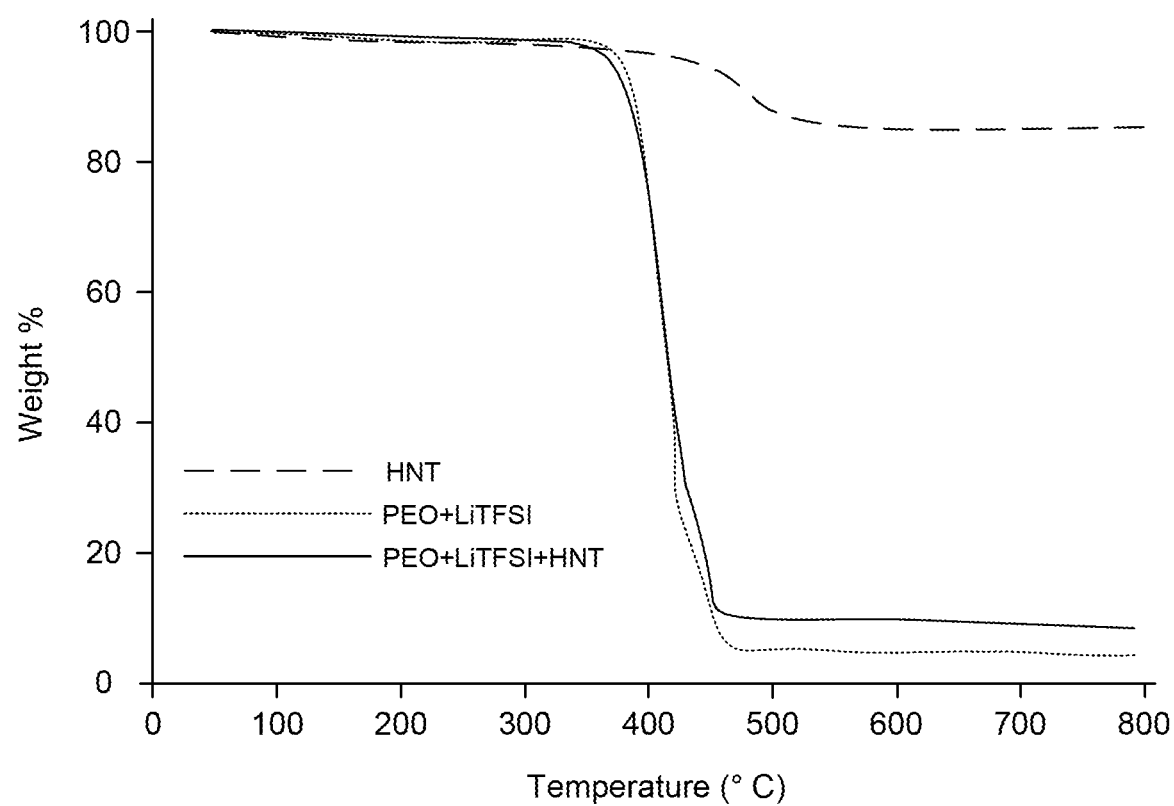
FIG. 10 is a graph of a thermogravimetric analysis of a PEO+LiTFSI+HNT electrolyte, a PEO+LiTFSI electrolyte, and HNT, in accordance with an example of the present technology.

FIG. 10 shows a thermogravimetric analysis of PEO+ LiTFSI+HNT, PEO+LiTFSI, and HNT. Thermal degradations were observed in the temperature range of 50–800° C. for the PEO+LiTFSI+HNT electrolyte, PEO+LiTFSI electrolyte, and HNT. Below 380° C., the curves of the three samples overlap with weight loss of about 2.0%. The weight loss below 105° C. of about 0.8% is due to the water that had been absorbed from the atmosphere. From 105 to 380° C., the 1.2% weight loss may be due to the loss of structural water. The main degradation of the electrolytes from about 380-450° C. corresponds to the decomposition of PEO and LiTFSI. The residuals for the PEO+LiTFSI+HNT and PEO+ LiTFSI electrolytes are 12% and 6%, respectively, which difference of 6% is due to the HNT thermal stability. Besides, it can be seen that HNT is stable up to about 430° C. with a weight loss of 12%. The residual of 86% above 500° C. may be from $Al_2O_3$ and $SiO_2$ nanoparticles. Thus, with the addition of HNT the composite solid electrolyte still displays strong thermal stability.

Figure 11:
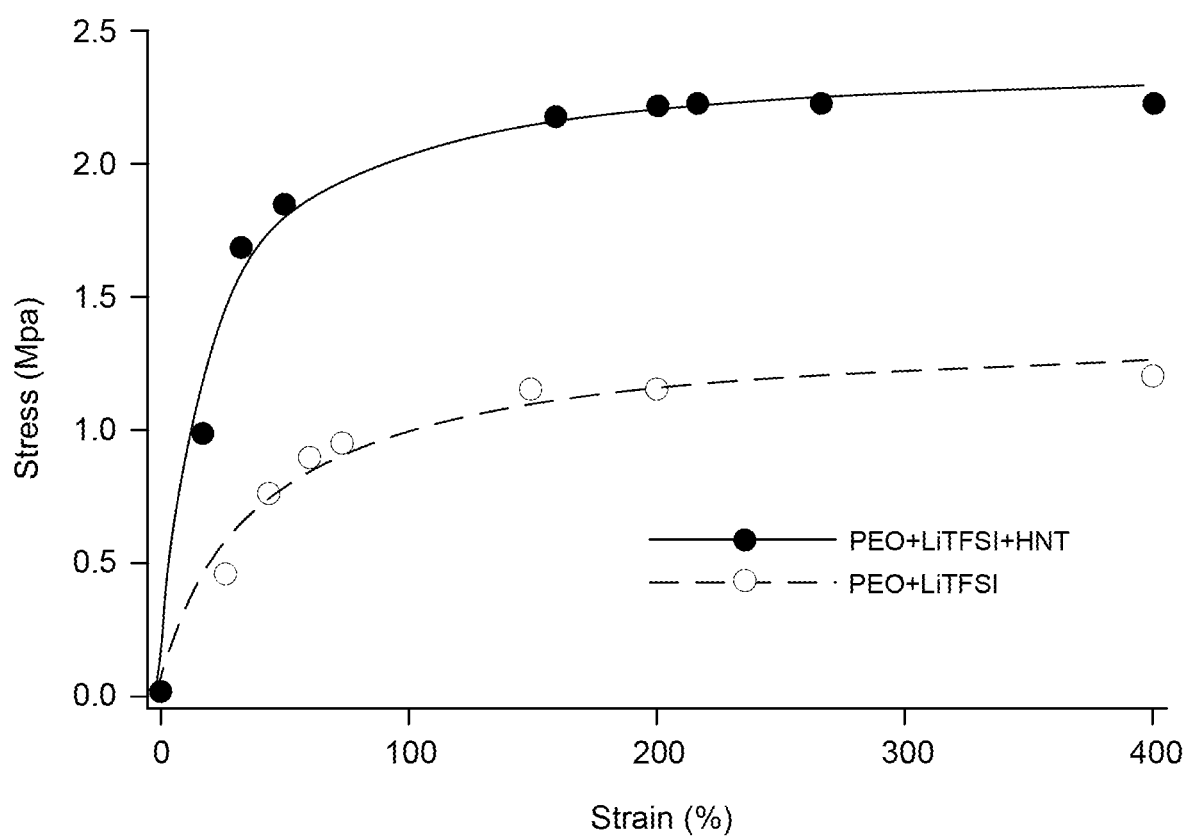
FIG. 11 is a graph of stress vs. strain for a PEO+LiTFSI+ HNT electrolyte and a PEO+LiTFSI electrolyte, in accordance with an example of the present technology.

In order to characterize the mechanical strength of the PEO+LiTFSI+HNT and PEO+LiTFSI electrolytes, tensile strength tests were performed. The electrolyte films were fixed on a heavy base and automatically pulled by a dynamometer connected to a lifting device. The stress as strain changes was recorded and the data fitted by the equation y=ab/(1+bx) (y is stress, x is strain, a and b are the constants), as shown in FIG. 11. The stress for both electrolytes increases linearly with strain and finally reaches a steady value. Even after stretch in the 400% strain state, the electrolytes remain non-fractured, demonstrating good flexibility of the composite solid electrolytes. However, the stress of the HNT electrolyte is higher than the pure PEO electrolyte in the whole stretching process. The stress of 2.28 MPa for the PEO+LiTFSI+HNT electrolyte at the strain of 400% is greater than 1.25 MPa for the PEO+LiTFSI electrolyte. This enhancement in the mechanical strength is attributed to the addition of HNT.

Example 7: Zeta Potential

Figure 12:
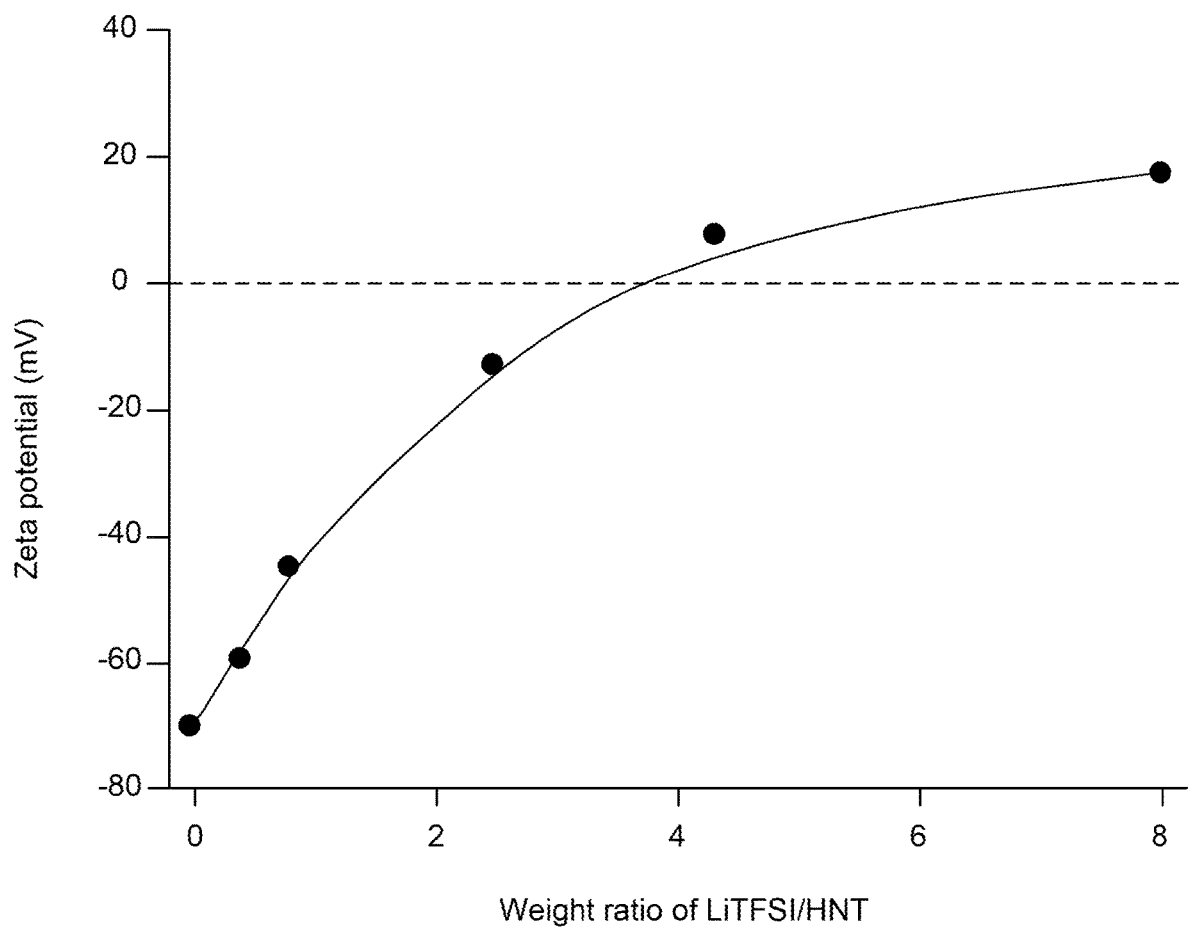
FIG. 12 is a graph of zeta potential of suspensions with various weight ratios of LiTFSI to HNT in acetonitrile, in accordance with an example of the present technology.

Zeta potential measurements were carried out to further investigate the proposed mechanism. Suspensions with different weight ratios of LiTFSI/HNT in acetonitrile were prepared for the measurements of zeta potential, and the results are shown in FIG. 12. At a ratio of 0, the zeta potential is −70.39 mV. As the ratio increases, the zeta potential increases from negative to positive with a reversal in the sign of the zeta potential at a ratio of 4. This ratio is close to the LiTFSI/HNT ratio with the highest ionic conductivity in the electrolyte. Thus, the charge reversal of the HNT particles reveals the change in adsorption of Li+ ions at the HNT surface.

Example 8: Solid State Battery Performance

Figure 13:
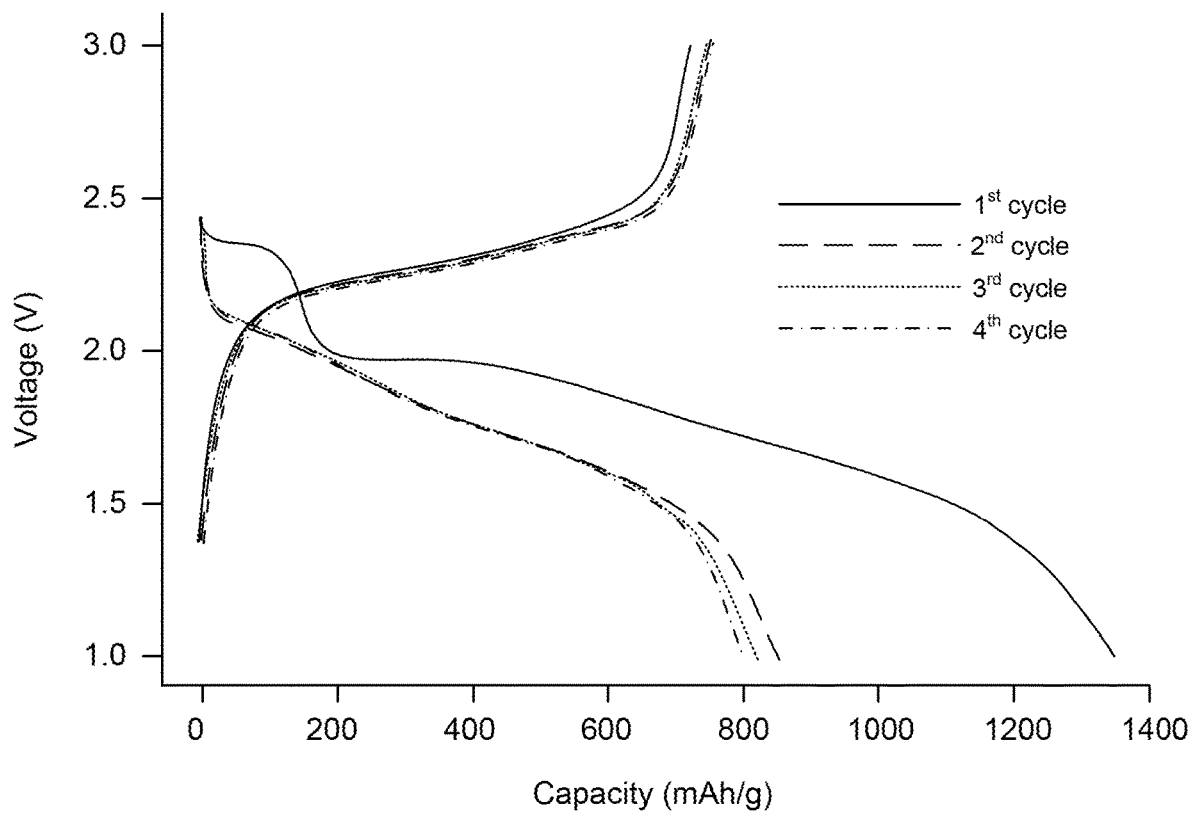
FIG. 13 is a graph of charge/discharge profiles of a solid state lithium battery at 25° C. and 0.1 C, in accordance with an example of the present technology.

The 10% HNT and EO:Li=15:1 composite solid electrolyte films were used to fabricate high capacity all-solid-state lithium-sulfur batteries. The sulfur cathode was synthesized as follows. Conductive carbon black (Super P) and sublimed sulfur were ball-milled to obtain the S/C composite. Aniline was then polymerized on the mixture by in situ chemical polymerization method. The obtained precipitate was filtered and washed with distilled water, dried in a vacuum oven and then treated at 280° C. to gain the macro-structural sulfur materials. The cathode was made from slurry of the macrostructural sulfur, Super P and binder (70:20:10 by weight). The slurry was then coated onto aluminum foil using a doctor blade and dried at 50° C. to form a sulfur cathode. The sulfur cathode on aluminum foil, HNT nanocomposite electrolyte, and lithium anode were stacked in sequence and hydraulically pressed using CR2025 shells. FIG. 13 shows the discharge/charge profiles of the all-solid-state lithium-sulfur battery at 25° C. and 0.1 C (1 C=1672 mA $g^{-1}$). In the first discharge cycle, two plateaus at 2.4-2.3 V and 2.0-1.5 V are seen. The total initial discharge capacity is 1350 mAh $g^{-1}$. During the first charging process, only one plateau at 2.1-2.5 V is present, and the initial charge capacity is 747 mAh $g^{-1}$. In the second discharge process, the plateau at 2.4-2.3 V disappears and a sloped curve at 2.2-1.5 V appears with a capacity of 854 mAh $g^{-1}$. The same capacity holds in subsequent cycles.

Figure 14:
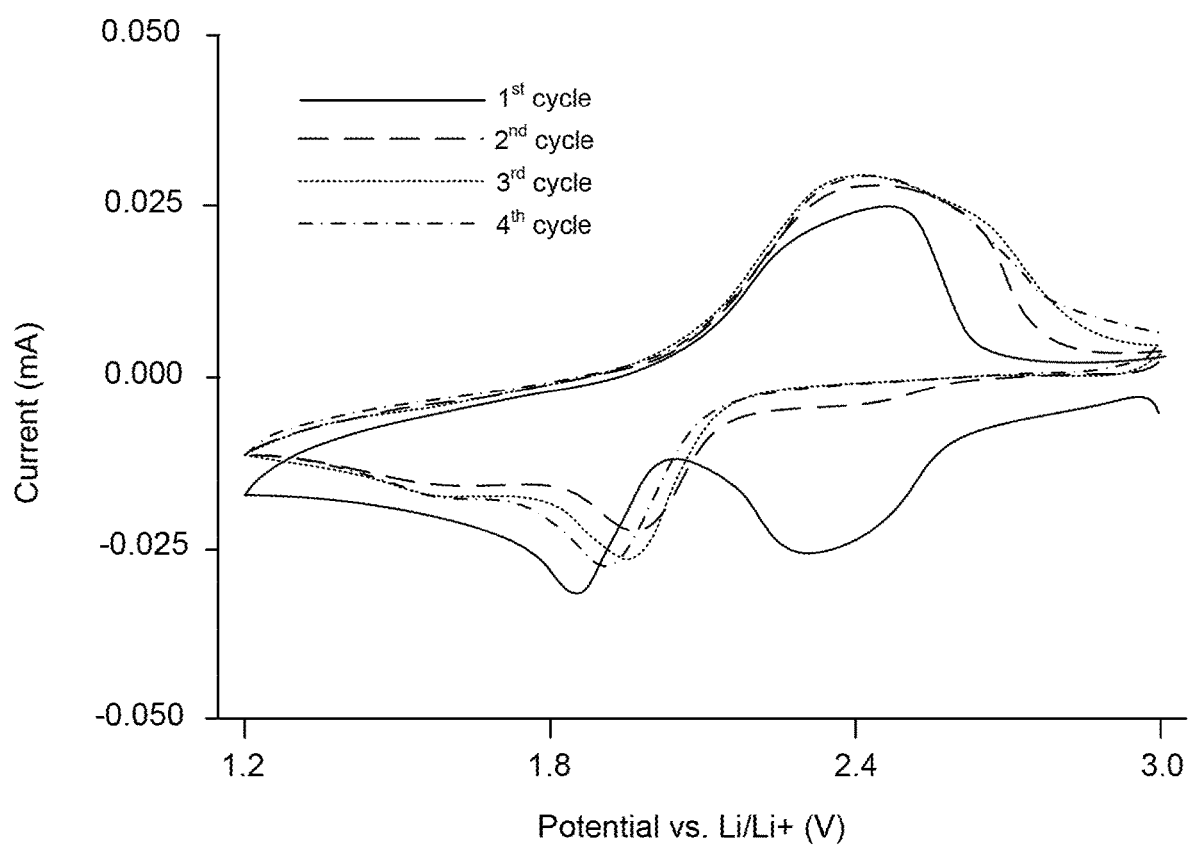
FIG. 14 is a graph of cyclic voltammetry curves for a solid state lithium battery at 25° C., in accordance with an example of the present technology.

FIG. 14 presents the CV curves for the battery at 25° C. In the first reduction scan, there exist two remarkable peaks at 1.85 V and 2.36 V, but in the first oxidation scan, only one peak at approximately 2.38 V is observed. In the following cycles, the position of the oxidation peak does not change, while the reduction peak at 2.36 V disappears and the reduction peak at 1.85 V moves to a higher position, revealing a reduced polarization after the first cycle. In addition, the CV curves of the third and fourth cycles are nearly overlapped. The CV results are in agreement with the charge/discharge behavior in FIG. 13.

Figure 15:
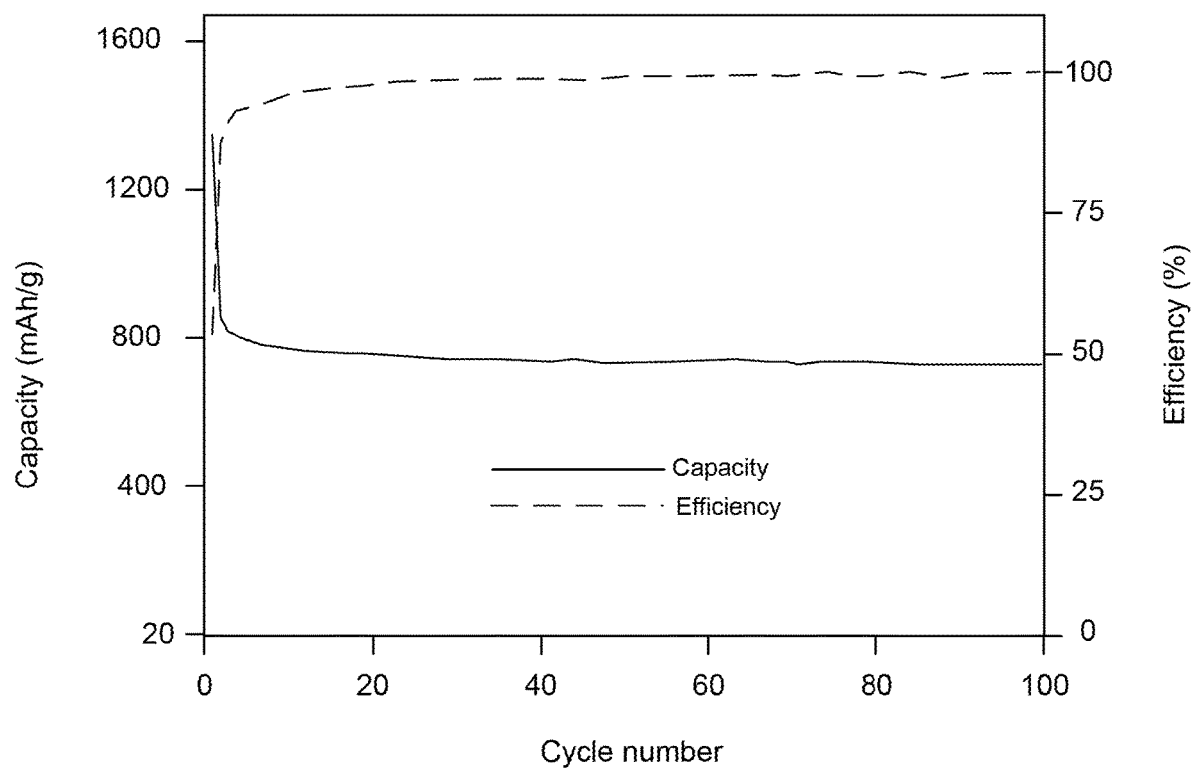
FIG. 15 is a graph of cycling performance of a solid state lithium battery at 25° C. and 0.1 C over 100 cycles, in accordance with an example of the present technology.

FIG. 15 shows the corresponding cycling performance of the battery at 25° C. and 0.1 C. The battery presents stable discharge capacities with an averaged value of 745±21 mAh $g^{-1}$ in the 100 discharge/charge cycles, with 87% retention compared to the second discharge capacity, and close to 100% efficiency for each cycle is achieved. The first reduction in CV and discharge curve during the 1st cycle is related to the transformation of macro-structural sulfur to —$S_4^{2-}$, and the second process is associated with reduction of —$S_4^{2-}$ to —$S^{2-}$. Only one oxidation process indicates that —$S^{2-}$ is oxidized to —$S_4^{2-}$ instead of macro-structural —$S_8$. This change of macro-structural —$S_8$ to —$S_4^{2-}$ causes the capacity decrease in the first cycle. But the intermediate is electrochemically stable and the battery shows high efficiency with close to 100% for all other cycles.

Figure 16:
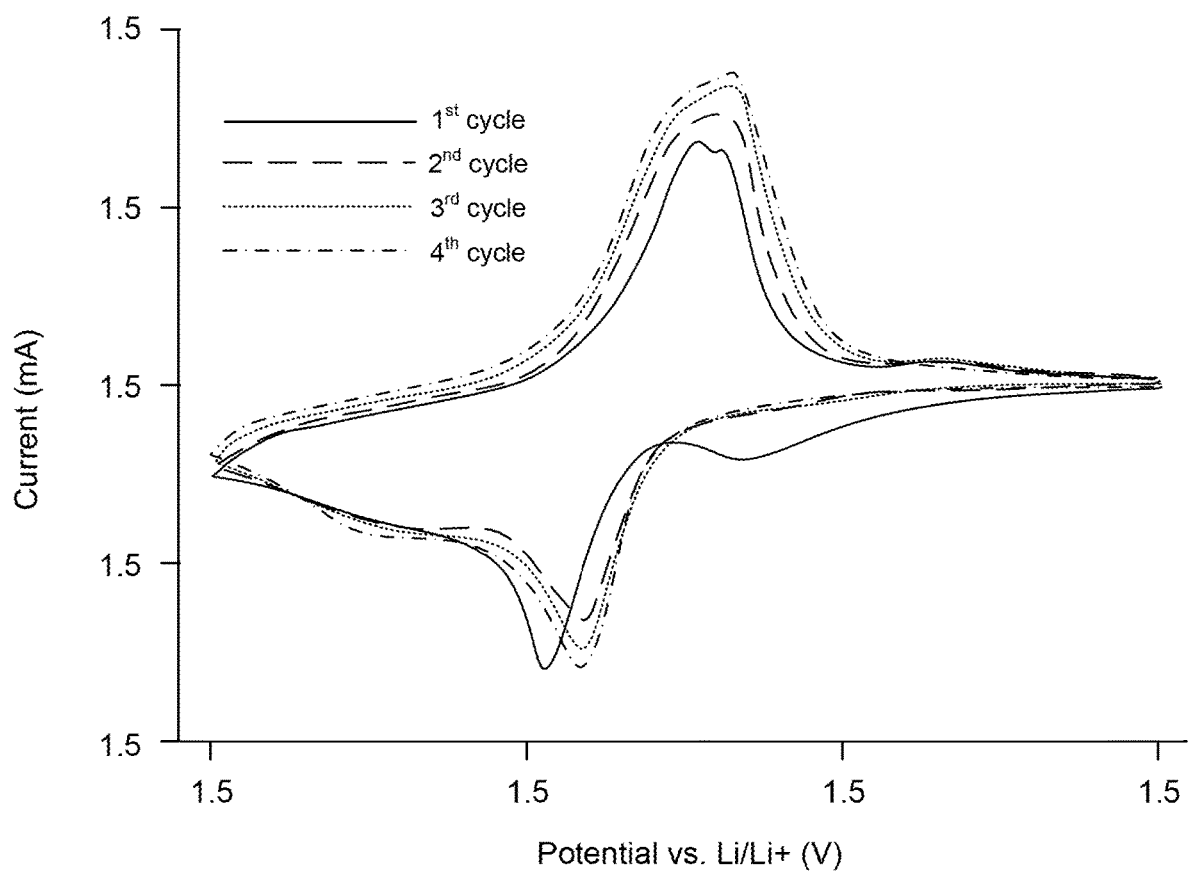
FIG. 16 is a graph of cyclic voltammetry curves for a solid state lithium battery at 100° C., in accordance with an example of the present technology.

High temperature CV data for the battery were also measured at 100° C., as shown in FIG. 16. The shape of the curves is similar to those at 25° C., but the reduction peak (~1.85 V) moves to higher levels (~2.05 V) and the oxidation peak (~2.38 V) to lower levels (~2.25 V). This implies a decrease in polarization, revealing higher ionic conductivity of the electrolyte and better surface contact between the electrolyte and electrodes at high temperature.

Figure 17:
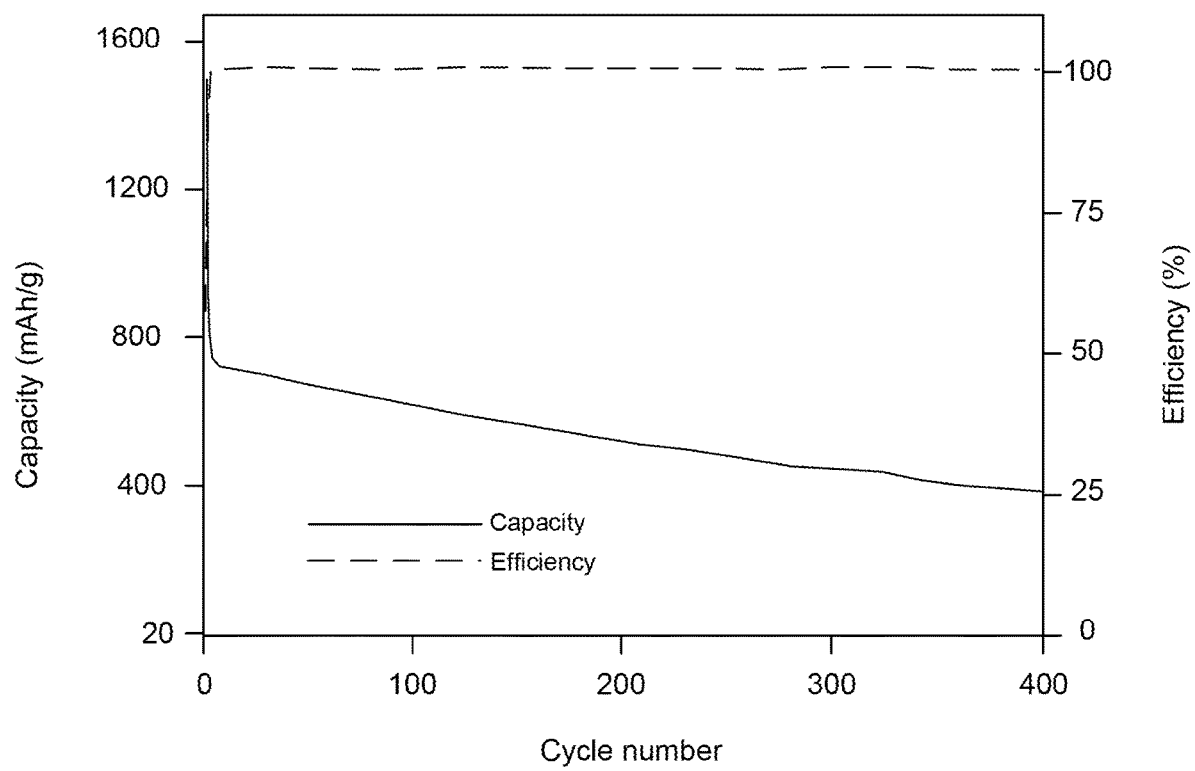
FIG. 17 is a graph of cycling performance of a solid state lithium battery at 100° C. and 4 C over 400 cycles, in accordance with an example of the present technology.

The cycling performance of the battery at 100° C. is presented in FIG. 17. At 0.3 C, the initial discharge capacity is 1493 mAh $g^{-1}$, which is reduced to 910 mAh $g^{-1}$ for the 2nd cycle. In order to further test a faster charge/discharge ability of the battery, experiments with an increase in the current rate of 4 C were performed. The battery delivers the discharge capacity of 809 mAh $g^{-1}$. After 400 cycles, the battery still has a discharge capacity of 386 mAh $g^{-1}$ and close to 100% efficiency for each cycle. These cycling results demonstrate that the natural halloysite nano-clay electrolyte for all-solid-state lithium-sulfur batteries can provide outstanding performance over a wide temperature range of 25-100° C.

Figure 18:
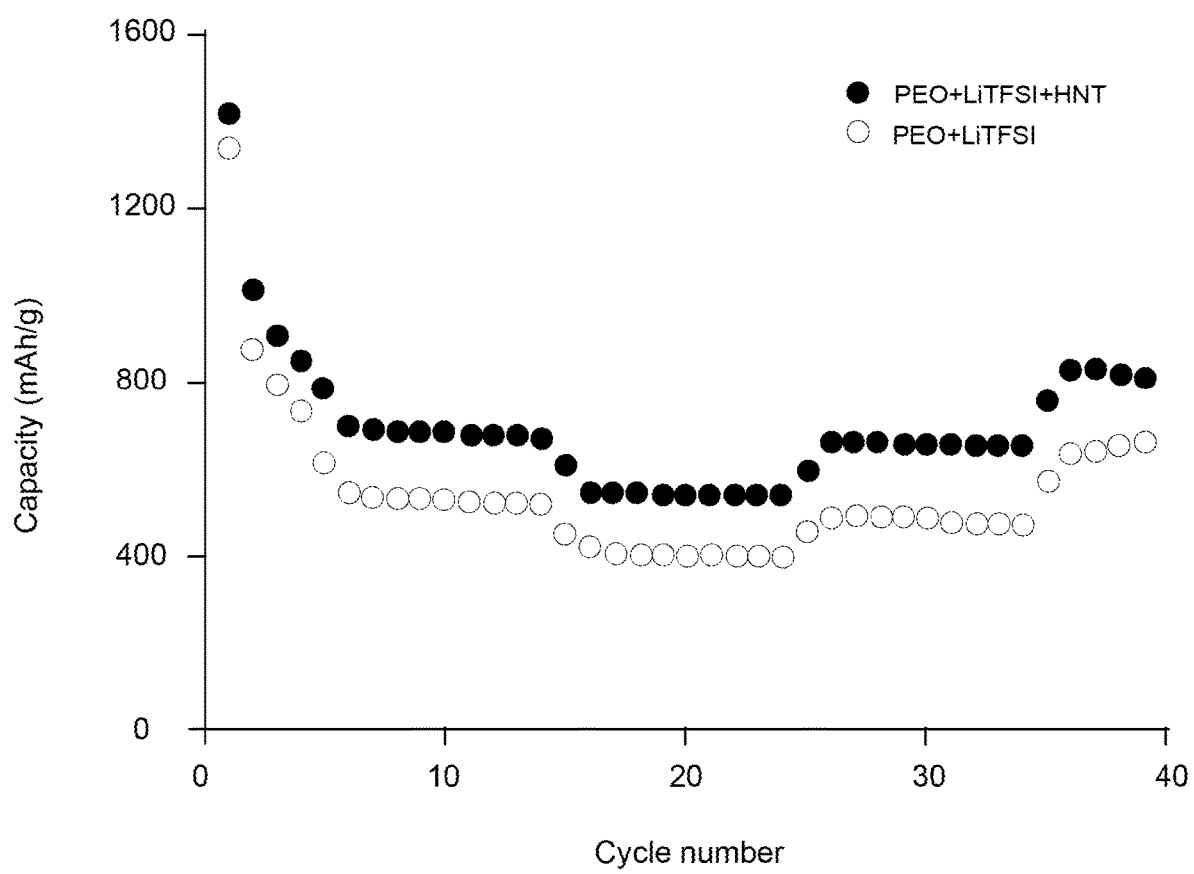
FIG. 18 is a graph of rate performance for a solid state lithium battery with a PEO+LiTFSI+HNT electrolyte compared with a battery having a PEO+LiTFSI electrolyte at 100° C., in accordance with an example of the present technology.

Rate performance of the lithium-sulfur battery with PEO+LiTFSI+HNT electrolyte was compared with the battery having PEO+LiTFSI electrolyte at 100° C. and the results are shown in FIG. 18. At all rates, the PEO+LiTFSI+HNT based battery shows higher capacity than that without HNT. The first discharge capacity for the PEO+LiTFSI+HNT based battery is 1410 mAh g and the average discharge capacities for the PEO+LiTFSI+HNT based battery are 919, 692, 545, 647 and 805 mAh g respectively, for rates of 0.3, 2, 4, 2 and 0.3 C. However, the initial discharge capacity of the PEO+LiTFSI based battery is 1333 mAh $g^{-1}$, and the average discharge capacities for the PEO+LiTFSI based battery are 798, 534, 409, 478 and 630 mAh $g^{-1}$ respectively, at the same rates that show an average decrease of 152 mAh $g^{-1}$. These indicate that the battery with HNT has significantly high capacity and cycling performance.

Figure 19:
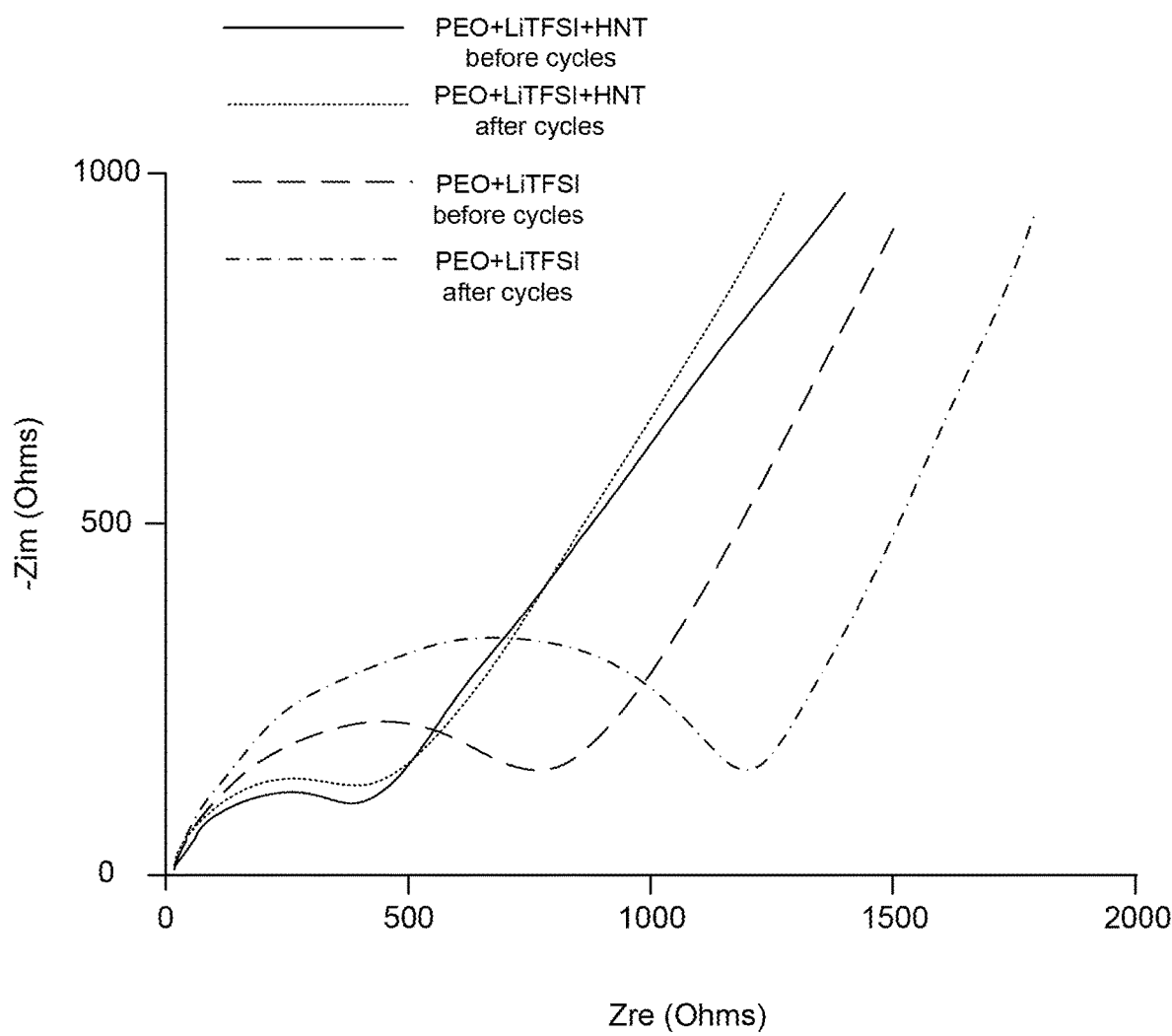
FIG. 19 is a graph of impedance spectra of a solid state lithium battery having a PEO+LiTFSI+HNT electrolyte and a battery having a PEO+LiTFSI electrolyte, before and after 39 charge-discharge cycles, in accordance with an example of the present technology.

In order to understand the better rate performance of the PEO+LiTFSI+HNT based battery, the impedance spectra of the PEO+LiTFSI+HNT and PEO+LiTFSI based batteries before and after 39 charge-discharge cycles were measured and the results are present in FIG. 19. The high-frequency intercept on the real axis represents the ohmic resistance (Ro) of the cell, including the electrolyte and electrode resistances. The diameter of the semi-circle in the high frequency region gives the charge-transfer resistance Rct at the electrodes/electrolyte interface. All the spectra show the same shape with one semi-circle at high frequency and an inclined line in the low frequency region. Therefore, no new interface is formed after cycles, demonstrating good stability of the electrolyte with both electrodes. The values of Ro and Rct for the PEO+LiTFSI+HNT battery are 13.4 and 461.6Ω (before cycling), and 13.6 and 510.8Ω (after cycling), while the corresponding values for the PEO+LiTFSI battery are 23.4 and 837Ω (before cycling), and 24.0 and 1290Ω (after cycling). The Ro value for the PEO+LiTFSI+HNT based battery is significantly lower, which is due to the higher ionic conductivity. However, for each battery, the Ro after cycling remains almost the same as before cycling, indicating good ionic conductivity for both electrolytes. The PEO+LiTFSI+HNT electrolyte has a lower Rct before cycling compared with PEO+LiTFSI. In addition, the PEO+LiTFSI+HNT electrolyte also shows a smaller increase of 11% in Rct after cycling than that of 54% for the PEO+LiTFSI electrolyte. The lower and more stable Rct appears to be a reason for higher capacity.

What is claimed is:

1. A composite solid electrolyte for solid-state lithium batteries, comprising:
   a solid polymer;
   phyllosilicate nanoparticles distributed in the solid polymer, wherein the phyllosilicate nanoparticles are bilayer phyllosilicates; and
   a lithium salt distributed in the solid polymer.

2. The composite solid electrolyte of claim 1, wherein the solid polymer comprises one or more of polyethylene oxide, polymethyl methacrylate, polycarbonate, polysiloxane, starch, sugar, fiber, polyvinyl alcohol, polyphosphazene and polystyrene.

3. The composite solid electrolyte of claim 2, wherein a molar ratio of ethylene oxide units to lithium ions (EO:Li) in the composite solid electrolyte is from 8:1 to 25:1.

4. The composite solid electrolyte of claim 1, wherein the composite solid electrolyte is formed as a thin film having a thickness from 1 μm to 300 μm.

5. The composite solid electrolyte of claim 4, wherein the thickness is from 10 μm to 100 μm.

6. The composite solid electrolyte of claim 1, wherein the phyllosilicate nanoparticles are in the form of nanotubes, nanoplatelets, or a combination thereof.

7. The composite solid electrolyte of claim 1, wherein the phyllosilicate nanoparticles comprise an aluminum based phyllosilicate, a magnesium based phyllosilicate, or a combination thereof.

8. The composite solid electrolyte of claim 1, wherein the bilayer phyllosilicate nanoparticles comprise one or more of halloysite, kaolinite, chrysotile, and antigorite.

9. The composite solid electrolyte of claim 1, wherein the phyllosilicate nanoparticles are chemically modified with a lithium ion.

10. The composite solid electrolyte of claim 1, wherein the phyllosilicate nanoparticles are functionalized by one or more of carbonate, ethylene oxide, and phosphazene.

11. The composite solid electrolyte of claim 1, wherein the phyllosilicate nanoparticles are in the form of nanotubes having a liquid polymer electrolyte impregnated in an interior volume of the nanotubes.

12. The composite solid electrolyte of claim 1, wherein the phyllosilicate nanoparticles are bilayer halloysite nanotubes.

13. The composite solid electrolyte of claim 1, wherein the composite solid electrolyte has a lithium ion conductivity of at least $10^{-4}$ S cm$^{-1}$ at 25° C.

14. The composite solid electrolyte of claim 1, wherein the lithium salt is LiTFSI.

15. The composite solid electrolyte of claim 1, wherein the phyllosilicate nanoparticles are present in an amount from 1 wt % to 30 wt %.

16. A solid state lithium battery cell, comprising:
   a composite solid electrolyte layer comprising:
      a solid polymer,
      phyllosilicate nanoparticles distributed in the solid polymer, wherein the phyllosilicate nanoparticles are bilayer phyllosilicates, and
      a lithium salt distributed in the solid polymer;
   an anode containing lithium in contact with a first surface of the composite solid electrolyte layer;
   a cathode in contact with a second surface of the composite solid electrolyte layer; and
   a casing that encloses the solid state lithium battery cell and excludes oxygen from within the solid state lithium battery cell.

17. The solid state lithium battery cell of claim 16, wherein the cathode comprises sulfur and the anode consists of lithium metal.

18. The solid state lithium battery cell of claim 16, wherein the solid polymer comprises polyethylene oxide and the phyllosilicate nanoparticles are halloysite nanotubes.

19. The composite solid electrolyte of claim 1, wherein the solid polymer comprises polyethylene oxide.

20. The solid state lithium battery cell of claim 16, wherein the solid state lithium battery cell including the solid polymer is a lithium polymer battery.

* * * * *